US007860773B1

(12) United States Patent
Golden

(10) Patent No.: US 7,860,773 B1
(45) Date of Patent: Dec. 28, 2010

(54) SYSTEM AND METHOD FOR PROVIDING SECURE RETIREMENT BENEFITS VIA A CONVERSION PROCESS

(75) Inventor: Jerome S. Golden, Scarsdale, NY (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

(21) Appl. No.: 09/541,197

(22) Filed: Apr. 3, 2000

(51) Int. Cl.
G06Q 40/00 (2006.01)
(52) U.S. Cl. .............................. 705/36; 705/35; 705/39; 705/40
(58) Field of Classification Search ................... 705/36, 705/37, 38, 39, 35, 40, 4; 395/235
See application file for complete search history.

(56) References Cited

U.S. PATENT DOCUMENTS

| | | | |
|---|---|---|---|
| 4,597,046 A | 6/1986 | Musmanno et al. ......... 364/408 |
| 4,642,768 A | 2/1987 | Roberts ...................... 364/408 |
| 4,648,038 A | 3/1987 | Norton et al. ............... 364/408 |
| 4,722,055 A | 1/1988 | Roberts ...................... 364/408 |
| 4,750,121 A | 6/1988 | Halley et al. ................ 364/408 |
| 4,752,877 A | 6/1988 | Roberts et al. ............. 364/408 |
| 4,839,804 A | 6/1989 | Roberts et al. ............. 364/408 |
| 4,953,085 A | 8/1990 | Atkins ........................ 364/408 |
| 4,969,094 A | 11/1990 | Halley et al. ................ 364/408 |
| 5,083,270 A | 1/1992 | Gross et al. ................. 364/408 |
| 5,101,353 A | 3/1992 | Lupien et al. ............... 364/408 |
| 5,126,936 A | 6/1992 | Champion et al. .......... 364/408 |
| 5,136,502 A | 8/1992 | Remortel et al. ............ 364/408 |
| 5,193,056 A | 3/1993 | Boes .......................... 364/408 |
| 5,214,579 A | 5/1993 | Wolfberg .................... 364/408 |
| 5,237,500 A | 8/1993 | Perg et al. ................... 364/408 |
| 5,291,398 A | 3/1994 | Hagan ........................ 364/408 |
| 5,471,575 A | 11/1995 | Giansante ................... 395/144 |
| 5,517,406 A | 5/1996 | Harris ......................... 364/408 |
| 5,523,942 A * | 6/1996 | Tyler et al. ..................... 705/4 |
| 5,592,379 A | 1/1997 | Finfrock .................... 395/239 |
| 5,631,828 A | 5/1997 | Hagan ....................... 395/204 |
| 5,644,727 A | 7/1997 | Atkins ....................... 395/240 |
| 5,673,402 A * | 9/1997 | Ryan et al. .................... 705/38 |

(Continued)

OTHER PUBLICATIONS

Harvey W. Rubin, PhD, CLU, CPCU, Barron's Dictionary of Insurance Terms, 1995, 3$^{rd}$ Ed., pp. 2 & 111.*

(Continued)

Primary Examiner—Charles R. Kyle
Assistant Examiner—Siegfried E. Chencinski
(74) Attorney, Agent, or Firm—Goodwin Procter LLP

(57) ABSTRACT

A method for providing a person with a secure retirement program employs a computerized system to allocate assets owned by a person towards purchase of retirement benefits. The system selects at least one desired retirement benefit from a group of available retirement benefits. A user may specify a conversion period for allocating the assets to the selected benefits during this conversion period. The system allocates portions of the assets towards purchasing a fraction of the selected benefits at selected intervals within the conversion period. Thereafter, the system calculates benefit payments corresponding to the selected retirement benefits to the person during and after the conversion period, wherein the benefit payments during the conversion period are from contributions made from the assets and the purchased benefits, and the benefit payments after the conversion period are provided by the purchased benefits.

39 Claims, 12 Drawing Sheets

U.S. PATENT DOCUMENTS

| | | | | |
|---|---|---|---|---|
| 5,704,045 | A * | 12/1997 | King et al. | 705/35 |
| 5,774,881 | A | 6/1998 | Friend et al. | 395/235 |
| 5,806,049 | A | 9/1998 | Petruzzi | 705/36 |
| 5,864,685 | A | 1/1999 | Hagan | 395/235 |
| 5,864,828 | A | 1/1999 | Atkins | 705/36 |
| 5,878,405 | A | 3/1999 | Grant et al. | 705/39 |
| 5,884,283 | A | 3/1999 | Manos | 705/30 |
| 5,893,071 | A * | 4/1999 | Cooperstein | 705/4 |
| 5,913,198 | A * | 6/1999 | Banks | 705/4 |
| 5,926,792 | A | 7/1999 | Koppes et al. | 705/4 |
| 5,933,815 | A * | 8/1999 | Golden | 705/36 R |
| 5,999,917 | A | 12/1999 | Facciani et al. | 705/36 |
| 6,012,043 | A | 1/2000 | Albright | 705/36 |
| 6,014,642 | A * | 1/2000 | El-Kadi et al. | 705/36 R |
| 6,018,722 | A | 1/2000 | Ray et al. | 705/36 |
| 6,021,397 | A * | 2/2000 | Jones et al. | 705/36 |
| 6,041,313 | A | 3/2000 | Gilbert | 705/36 |
| 6,064,986 | A | 5/2000 | Edelman | 705/36 |
| 6,085,174 | A | 7/2000 | Edelman | 705/36 |
| 6,154,732 | A * | 11/2000 | Tarbox | 705/36 |
| 6,205,434 | B1 * | 3/2001 | Ryan et al. | 705/36 R |
| 6,275,807 | B1 * | 8/2001 | Schirripa | 705/36 R |
| 2001/0014873 | A1 * | 8/2001 | Henderson et al. | 705/35 |

OTHER PUBLICATIONS

John Downes and Jordan Elliot Goodman, Barron's Dictionary of Finance and Investment Terms, 1995, 4$^{th}$ Ed., p. 101.*
John Downes and Elliot Goodman, Dictionary of Finance and Investment Terms, 1995, Barron's Financial Guides, Fifth Edition, p. 119.*
Harvey W. Rubin, Ph. D., CLU, CPCU; Dictionary of Insurance Terms, 1995, Barron's Business Guides, Third Edition, pp. 78-79.*
David W. Brownstone & Irene M. Franck, The VNR Investor's Dictionary, 1981,Van Nostrand Reinhold Ltd., p. 78.*
Handicapping the Savings Race; Jan. 1999; Best's Review, A. M. Best, Inc.; p. 5.*
Jerry M. Rosenberg, Dictionary of Investing; John Wiley & Sons, Inc.; pp. 83-85.*
Barron's Dictionary of Insurance Terms, 3rd Ed., Barron's Dictionary of Finance and Investment Terms, Barron's Business Guides, Fifth Ed., 1995, pp. 103-104.*
Barron's Dictionary of Finance and Investment Terms, Baron's Financial Guides, Fifth Ed., 1995, p. 119.*
International Search Report dated Aug. 2, 2001.

* cited by examiner

Fig. 4a

| | Decision Status | A | B | C | D | E | F | G |
|---|---|---|---|---|---|---|---|---|
| 1 | Conversion Period | 1, 5, 10, 15 | Dec. | | | | | |
| 2 | Asset Vehicle & Investment Vehicle | None | | Dec. | | | | Final Decision |
| 3 | Collar | Def. 90-110% | Dec. | | | | | |
| 4 | Benefit Index | Def. Level or CoLA | | | Dec. | | | |
| 5 | Stop / Loss | Def 0 | | | | | Dec. | Final Decision |
| 6 | Pension | Dec. (Yes or No) | | | | | | |
| 7 | Survivor | Dec. (Yes or No) | Def. 100% | | | Dec. | | |
| 8 | Caregiver | Def 0 | | | | | | Final Decision |
| 9 | Long Term Care | Def 0 | | | | | Dec. | |
| 10 | Legacy Income | Def 0 | | | | Dec. | | Final Decision |
| 11 | Legacy Lump Sum | Def 0 | | | | | Dec. | |

402
404
406
408
409
410
411
412
414
416
418

Benefit Choices — 502

| | |
|---|---|
| Deposit | $100,000.00 |
| Period | 15 Years |
| Client 1 | 70 M |
| Client 2 | 65 F |
| &Survivor | 100% |

500

| | | | Algorithm | | | IRA Account | | | | Benefit Account | | | | Actual |
|---|---|---|---|---|---|---|---|---|---|---|---|---|---|---|
| | | | | | | | | | | | Purchased Benefit | | New Benefit | |
| Year | Stock Market Return (%) | Current Interest Rates (%) | IRA & Benefit Value BOY | Payment Target | Payment Collared | Value BOY | Transfer | Withdraw | Value EOY | Value BOY | New | Cumul. | Value EOY | Total Payment |
| 1 | 12.37 | 6.00 | 100,000 | 8,655 | 8,655 | 100,000 | 6,667 | 8,078 | 96,797 | 0 | 577 | 577 | 6,556 | 8,655 |
| 2 | 14.54 | 5.94 | 103,354 | 9,143 | 9,143 | 96,797 | 6,952 | 7,954 | 94,959 | 6,556 | 612 | 1,189 | 14,031 | 9,143 |
| 3 | 12.25 | 5.23 | 108,990 | 9,867 | 9,521 | 94,959 | 7,878 | 7,664 | 90,084 | 14,031 | 668 | 1,856 | 21,793 | 9,521 |
| 4 | 19.45 | 4.98 | 111,877 | 10,379 | 9,521 | 90,084 | 8,337 | 6,954 | 90,688 | 21,793 | 710 | 2,567 | 29,044 | 9,521 |
| 5 | 22.49 | 5.08 | 119,732 | 11,399 | 9,521 | 90,688 | 9,086 | 6,151 | 93,804 | 29,044 | 803 | 3,370 | 36,552 | 9,521 |
| 6 | (21.59) | 5.24 | 130,356 | 12,754 | 9,521 | 93,804 | 10,181 | 5,213 | 60,353 | 36,552 | 938 | 4,308 | 42,447 | 9,521 |
| 7 | 1.98 | 6.10 | 102,799 | 10,353 | 9,521 | 60,353 | 6,618 | 4,541 | 50,259 | 42,447 | 672 | 4,980 | 49,077 | 9,521 |
| 8 | 1.41 | 5.69 | 99,337 | 10,313 | 9,521 | 50,259 | 6,571 | 3,874 | 40,429 | 49,077 | 667 | 5,646 | 58,332 | 9,521 |
| 9 | 5.90 | 4.59 | 98,761 | 10,587 | 9,521 | 40,429 | 7,292 | 3,168 | 31,925 | 58,332 | 706 | 6,352 | 60,744 | 9,521 |
| 10 | 28.09 | 5.16 | 92,669 | 10,274 | 9,521 | 31,925 | 6,251 | 2,515 | 30,370 | 60,744 | 654 | 7,006 | 65,837 | 9,521 |
| 11 | 10.28 | 4.87 | 96,207 | 11,049 | 9,521 | 30,370 | 7,599 | 1,706 | 23,405 | 65,837 | 809 | 7,815 | 71,920 | 9,521 |
| 12 | (5.43) | 4.59 | 95,325 | 11,359 | 9,521 | 23,405 | 8,156 | 820 | 13,602 | 71,920 | 886 | 8,701 | 75,956 | 9,521 |
| 13 | 25.98 | 4.76 | 89,558 | 11,091 | 9,521 | 13,602 | 6,957 | 23 | 8,348 | 75,956 | 797 | 9,498 | 78,138 | 9,521 |
| 14 | 10.63 | 5.02 | 86,487 | 11,150 | 9,521 | 8,348 | 6,797 | 0 | 1,716 | 78,138 | 826 | 10,324 | 81,831 | 10,324 |
| 15 | 19.18 | 4.91 | 83,547 | 11,231 | 9,521 | 1,716 | 1,716 | 0 | 0 | 81,831 | 216 | 10,540 | 80,202 | 10,540 |
| 16 | 0.00 | 4.82 | 80,202 | 0 | 0 | 0 | 0 | 0 | 0 | 80,202 | 0 | 10,540 | N/A | 10,540 |

Percent of Target: 122%

Fig 5a

Benefit Choices — 502

| Deposit | $100,000.00 |
|---|---|
| Period | 15 Years |
| Client 1 | 70 M |
| Client 2 | 65 F |
| J&Survivor | 100% |

500

| | Stock Market Return (%) | Current Interest Rates (%) | Algorithm | | | | IRA Account | | | | Benefit Account | | | | Actual Total |
|---|---|---|---|---|---|---|---|---|---|---|---|---|---|---|---|
| | | | IRA & Benefit | Payment | | | | | | | Purchased Benefit | | | | |
| Year | | | Value BOY | Target | Collared | | Value BOY | Transfer | Withdraw | Value EOY | Value BOY | New | Culmul. | Value EOY | Payment |
| 1 | -3.57 | 6.00 | 100,000 | 8,655 | 8,655 | | 100,000 | 6,667 | 8,078 | 81,923 | 0 | 577 | 577 | 6,438 | 8,655 |
| 2 | 4.88 | 6.15 | 88,361 | 7,817 | 7,817 | | 81,923 | 5,770 | 6,722 | 73,146 | 6,438 | 517 | 1,094 | 10,979 | 7,817 |
| 3 | 12.99 | 7.18 | 84,125 | 7,616 | 7,790 | | 73,146 | 5,034 | 6,194 | 70,766 | 10,979 | 502 | 1,596 | 17,578 | 7,790 |
| 4 | 12.26 | 5.74 | 88,344 | 8,196 | 8,196 | | 70,766 | 6,058 | 6,050 | 66,593 | 17,578 | 550 | 2,146 | 27,127 | 8,196 |
| 5 | 6.37 | 3.80 | 93,720 | 8,922 | 8,922 | | 66,593 | 7,788 | 6,161 | 56,388 | 27,127 | 616 | 2,762 | 34,602 | 8,922 |
| 6 | (20.85) | 3.52 | 90,990 | 8,903 | 8,903 | | 56,388 | 7,694 | 5,527 | 33,016 | 34,602 | 614 | 3,376 | 36,851 | 8,903 |
| 7 | 11.26 | 4.77 | 69,866 | 7,036 | 7,790 | | 33,016 | 4,439 | 4,007 | 27,787 | 36,851 | 407 | 3,783 | 41,095 | 7,790 |
| 8 | 33.74 | 4.40 | 68,881 | 7,151 | 7,790 | | 27,787 | 4,575 | 3,586 | 27,457 | 41,095 | 421 | 4,204 | 45,873 | 7,790 |
| 9 | 17.35 | 3.88 | 73,330 | 7,861 | 7,861 | | 27,457 | 5,702 | 3,135 | 22,395 | 45,873 | 522 | 4,726 | 49,672 | 7,861 |
| 10 | 5.60 | 3.86 | 72,066 | 7,990 | 7,990 | | 22,395 | 5,717 | 2,720 | 14,892 | 49,672 | 544 | 5,270 | 52,496 | 7,990 |
| 11 | 11.01 | 4.04 | 67,388 | 7,739 | 7,790 | | 14,892 | 4,919 | 2,026 | 9,045 | 52,496 | 494 | 5,764 | 57,459 | 7,790 |
| 12 | (19.53) | 3.43 | 66,504 | 7,925 | 7,925 | | 9,045 | 5,385 | 1,621 | 1,325 | 57,459 | 540 | 6,304 | 60,935 | 7,925 |
| 13 | 3.16 | 3.23 | 62,259 | 7,711 | 7,790 | | 1,325 | 1,325 | 0 | 0 | 60,935 | 137 | 6,441 | 56,935 | 6,441 |
| 14 | (0.12) | 3.88 | 56,935 | 0 | 0 | | 0 | 0 | 0 | 0 | 56,935 | 0 | 6,441 | 55,256 | 6,441 |
| 15 | 4.22 | 3.61 | 55,256 | 0 | 0 | | 0 | 0 | 0 | 0 | 55,256 | 0 | 6,441 | 49,685 | 6,441 |
| 16 | 0.00 | 4.58 | 49,685 | 0 | 0 | | 0 | 0 | 0 | 0 | 49,685 | 0 | 6,441 | N/A | 6,441 |

Percent of Target — 74% ← 534

Fig 5b

Benefit Choices 502

| Deposit | $100,000.00 |
| Period | 15 Years |
| Client 1 | 70 M |
| Client 2 | 65 F |
| M&Survivor | 100% |

500

| | Stock Market Return (%) | Current Interest Rates (%) | Algorithm | | | | IRA Account | | | | Benefit Account | | | | Actual Total Payment |
|---|---|---|---|---|---|---|---|---|---|---|---|---|---|---|---|
| | | | IRA & Benefit Value BOY | Payment Target | Payment Collared | | Value BOY | Transfer | Withdraw | Value EOY | Purchased Benefit Value BOY | New | Cumul. | Value EOY | |
| Year | | | | | | | | | | | | | | | |
| 1 | 0.98 | 6.00 | 100,000 | 8,655 | 8,655 | | 100,000 | 6,667 | 8,078 | 86,170 | 0 | 577 | 577 | 6,062 | 8,655 |
| 2 | 17.84 | 6.87 | 92,232 | 8,779 | 8,779 | | 86,170 | 6,155 | 7,616 | 86,673 | 6,062 | 586 | 1,163 | 12,518 | 8,779 |
| 3 | (1.30) | 6.31 | 99,191 | 9,215 | 9,215 | | 86,673 | 6,667 | 7,432 | 71,536 | 12,518 | 619 | 1,782 | 17,732 | 9,215 |
| 4 | 15.49 | 7.01 | 89,269 | 8,972 | 8,972 | | 71,536 | 5,961 | 6,591 | 69,143 | 17,732 | 599 | 2,381 | 23,550 | 8,972 |
| 5 | 31.69 | 6.77 | 92,694 | 9,373 | 9,373 | | 69,143 | 6,286 | 6,356 | 76,421 | 23,550 | 636 | 3,017 | 29,845 | 9,373 |
| 6 | (0.27) | 6.43 | 106,266 | 10,743 | 9,521 | | 76,421 | 7,642 | 5,731 | 62,861 | 29,845 | 773 | 3,790 | 38,006 | 9,521 |
| 7 | (13.24) | 5.87 | 100,867 | 10,058 | 9,521 | | 62,861 | 6,985 | 5,035 | 43,441 | 38,006 | 696 | 4,486 | 44,335 | 9,521 |
| 8 | 12.60 | 5.65 | 87,776 | 8,882 | 8,882 | | 43,441 | 5,430 | 3,846 | 38,955 | 44,335 | 549 | 5,035 | 48,935 | 8,882 |
| 9 | 18.82 | 5.43 | 87,890 | 9,044 | 9,044 | | 38,955 | 5,565 | 3,436 | 36,237 | 48,935 | 573 | 5,608 | 55,051 | 9,044 |
| 10 | (0.15) | 4.79 | 91,288 | 9,300 | 9,300 | | 36,237 | 6,040 | 3,076 | 27,075 | 55,051 | 615 | 6,223 | 59,052 | 9,300 |
| 11 | (5.49) | 4.73 | 86,127 | 9,077 | 9,077 | | 27,075 | 5,415 | 2,283 | 18,188 | 59,052 | 571 | 6,794 | 60,647 | 9,077 |
| 12 | 12.44 | 5.05 | 78,835 | 8,832 | 8,832 | | 18,188 | 4,547 | 1,528 | 13,810 | 60,647 | 509 | 7,303 | 63,794 | 8,832 |
| 13 | (19.29) | 4.75 | 77,604 | 8,884 | 8,884 | | 13,810 | 4,603 | 1,054 | 6,376 | 63,794 | 527 | 7,830 | 64,731 | 8,884 |
| 14 | 21.69 | 4.94 | 71,107 | 8,602 | 8,602 | | 6,376 | 3,188 | 386 | 3,494 | 64,731 | 386 | 8,216 | 63,966 | 8,602 |
| 15 | 30.04 | 5.21 | 67,460 | 8,665 | 8,665 | | 3,494 | 3,494 | 0 | 0 | 63,966 | 449 | 8,665 | 65,616 | 8,665 |
| 16 | 0.00 | 4.90 | 65,616 | 8,665 | 8,665 | | 0 | 0 | 0 | 0 | 65,616 | 0 | 8,665 | N/A | 8,665 |

Percent of Target 100%

Fig. 5c

SYSTEM AND METHOD FOR PROVIDING SECURE RETIREMENT BENEFITS VIA A CONVERSION PROCESS

FIELD OF THE INVENTION

This invention relates generally to investments and insurance, and actuarial methods to secure retirement benefits, and, more particularly, to an Internet based computerized method for the conversion of personal assets into a personal retirement or monetary benefits program.

BACKGROUND OF THE INVENTION

To many, achieving a worry-free retirement is a dream that will most likely not materialize. Indeed, considering the high cost of living and tremendous foresight required to properly plan for retirement, many never accumulate sufficient assets to provide for the income and benefits they need or desire. According to the Employee Benefit's Research Institute's 1997 retirement confidence survey, of the people who thought they could afford to retire, 30% report their standard of living is worse than at the end of their career and 36% are not confident they will have enough to remain comfortable.

Currently, retirees and individuals investing for retirement have access to a plurality of products that provide for the many financial and other needs that may arise. For example, equity mutual funds can provide potential for market appreciation, life annuities can offer retirees a fixed annual income from a predetermined point until death; life insurance can offer retirees a guaranteed death benefit as well as a secure cash value; long-term care agreements can offer retirees insurance for certain health care benefits; home equity loans can provide a source of cash, etc. Unfortunately, many still do not achieve their retirement objectives due to the fact that they are overwhelmed by the large selection of products and do not properly understand the functionality and purpose of the products they eventually purchase. Often, individuals do not fully understand the nature of risks involved, whether it be market risk or actuarial risk.

Moreover, aside from the often complex aspects of purchasing an insurance or investment product, wherein many individuals end up purchasing inappropriate products, even those who are fully informed and correctly match their current needs with the right product, frequently are not capable to cope with changes in life, where previously purchased products are no longer satisfactory. Unfortunately, the currently offered insurance products do not provide the flexibility to alter the purchased benefits and income once the product has been purchased or 'locked' in. Also, by locking in one's assets into a guaranteed insurance product, clients lose out on the potentially higher yields of the stock market or other investment product. Meanwhile, while investment products offer flexibility, they do not provide protection against actuarial risks.

In addition, most guaranteed insurance products have the inherent characteristic of fulfilling a single fixed objective, such as a lifetime income or a guaranteed death payment. As such, providers of insurance lack the ability and incentive to modify the arrangements to meet the clients' needs once the product is sold and that single fixed objective of the insurance achieved. Most people, on the other hand, do not have single fixed objectives and are thus ill suited for products that do not correspond to their need to adapt and change with time. Most people also want flexibility without being forced to lock into a specific product too soon.

Thus, what is needed is an integrated individual retirement system that offers the flexibility to change as needs change while moving to a secure retirement stage over time. This system should further address the confusing elements of insurance and actuarial products so that individuals can properly obtain a flexible benefit program that most nearly satisfies their retirement objectives and changed circumstances over time.

OBJECTS AND SUMMARY OF THE INVENTION

It is thus a general object of the present invention to provide a system and method for the conversion of personal assets into an individual retirement benefit program.

In accordance with one object of the invention a retirement system is provided, comprising a method for providing a person with desired secure monetary or retirement benefits. Initially, a client approaches the system of this invention with an identified portion of assets that are to be converted to a range of various retirement benefits, the amounts of which may be selected by the client as part of the process. Then a conversion period may be specified in which to convert the assets to the secure monetary benefits.

Typically, an example of a personal asset accumulated over a period of time may be a qualified asset such as an individual retirement account (IRA). A retiring individual who has accumulated funds in an IRA is faced with the decision to purchase guaranteed life time benefits with the entire assets in the account, and to forego market gains had the funds in the account remained invested, or to take distributions from the market-invested IRA, which may run out or decrease rather than increase over time.

Other examples of a personal asset accumulated over a period of time may be the home equity built by an individual who has lived in the same residence for a number of years. Again, a retiring individual who owns a residence substantially free and clear has at its disposal a valuable real estate asset that does not generate current cash flow and left unattended will leave a significant inheritance for beneficiaries. A home equity loan requires the individual to pay monthly mortgage payments which if not planned properly may lead to unnecessary financial burdens or even a forced move out, without any assurance of a lifetime benefit.

Moreover, retirement plans of many individuals may be completely devastated by the effects of illnesses that require long term care or significant medical costs that are not covered by Medicare.

The individual retirement system, in accordance with one embodiment of the invention, provides actuarially matched, fungible, market valued, secure retirement benefits based on an initial conversion of assets, while allowing the person to control volatility during a time phased conversion period. Thus, individuals can use the system of this invention to gradually convert personal assets into a personal retirement benefits program while dollar cost averaging out of their current investment vehicles, which may be volatile from a market return standpoint or may be illiquid as in the case of home equity. Furthermore, the individuals who employ the system in accordance with the present invention, may also accelerate or decelerate the conversion period at any time during that period to allocate their asset vehicles towards desired targeted benefits.

Moreover, the personal retirement benefits program is specifically configured so that individuals can purchase the benefits they need via the Internet, without necessarily having to deal with the multitude of complex insurance and investment products that attempt to provide such benefits. Thus in accordance with another embodiment, the individual retirement system of the present invention allows a customer to purchase a benefit program that comprises a plurality of different components referred to as benefit vehicles, such as for example, lifetime income, survivor income, caregiver benefits, legacy income benefits, lump sum legacy benefits, and long term care benefits.

Thus, in accordance with one embodiment of the invention, each individual may set up a benefit program, referred to as a benefit account, that has one or many benefit vehicle components. The system then employs an actuarial valuation component or module to evaluate each of the benefit vehicles selected by the client. The client may also select a plurality of benefit indices, such as level, cost of living (COLA) indices and market-linked, which over time may affect the value of each of the benefit vehicles.

The system, furthermore, calculates and stores the information on the market value of each of the benefits purchased or funded. This allows the system to offer a uniquely flexible arrangement such that a client can modify the amount of benefit allocated to some of the benefit vehicles based on, among other things, change in personal circumstances.

It is understood, as will be explained in more detail below, that in alternative embodiments the system described herein can employ telecommunication links other than the Internet. Moreover, in yet other embodiments, the system of this invention can similarly be adopted to provide advice and retirement benefits via a personal, non-computerized system as well.

During the conversion period, portions of the assets are allocated toward a fraction of secure monetary benefits at selected intervals within the conversion period. At least one of the distributions or payments to the client, corresponding to each of the benefit vehicle components, are then made to the client during and after the conversion period, wherein the distribution during the conversion period is taken from both the asset vehicles and the benefit account, and the distribution after the conversion period is taken from the benefit account.

In accordance with another embodiment of the invention a client's personal assets may be converted to asset vehicle accounts maintained by the individual retirement income system. These asset vehicle accounts may each comprise a choice of investment vehicles, such as money market funds, bond funds, index funds, market linked deposits and stocks, that may be selected by the client to fund the benefit program tailored to the client's needs.

The conversion period and the benefits may be modified by the clients as they encounter changes in their personal circumstances. The system is designed to allow changes to continue over a client's lifetime, as well as the lifetime of the surviving spouse.

The above description sets forth rather broadly the more important features of the present invention in order that the detailed description thereof that follows may be understood, and in order that the present contributions to the art may be better appreciated. Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

BRIEF DESCRIPTION OF THE DRAWINGS

In the drawings in which like reference characters denote similar elements throughout the several views:

FIG. 4a shows a decision matrix, illustrating the decisions made by individual users of this system, according to one embodiment of the invention;

FIG. 4b illustrates an exemplary display that allows a client to interact with the system to obtain results in response to a series of "what if" scenarios based on the decision options illustrated in FIG. 4a;

FIGS. 5a-5c illustrate different simulation tables, each showing a possible outcome of the conversion process of this invention, based on the decisions made in the decision matrix, according to one embodiment;

DETAILED DESCRIPTION OF THE INVENTION

Figure 1:
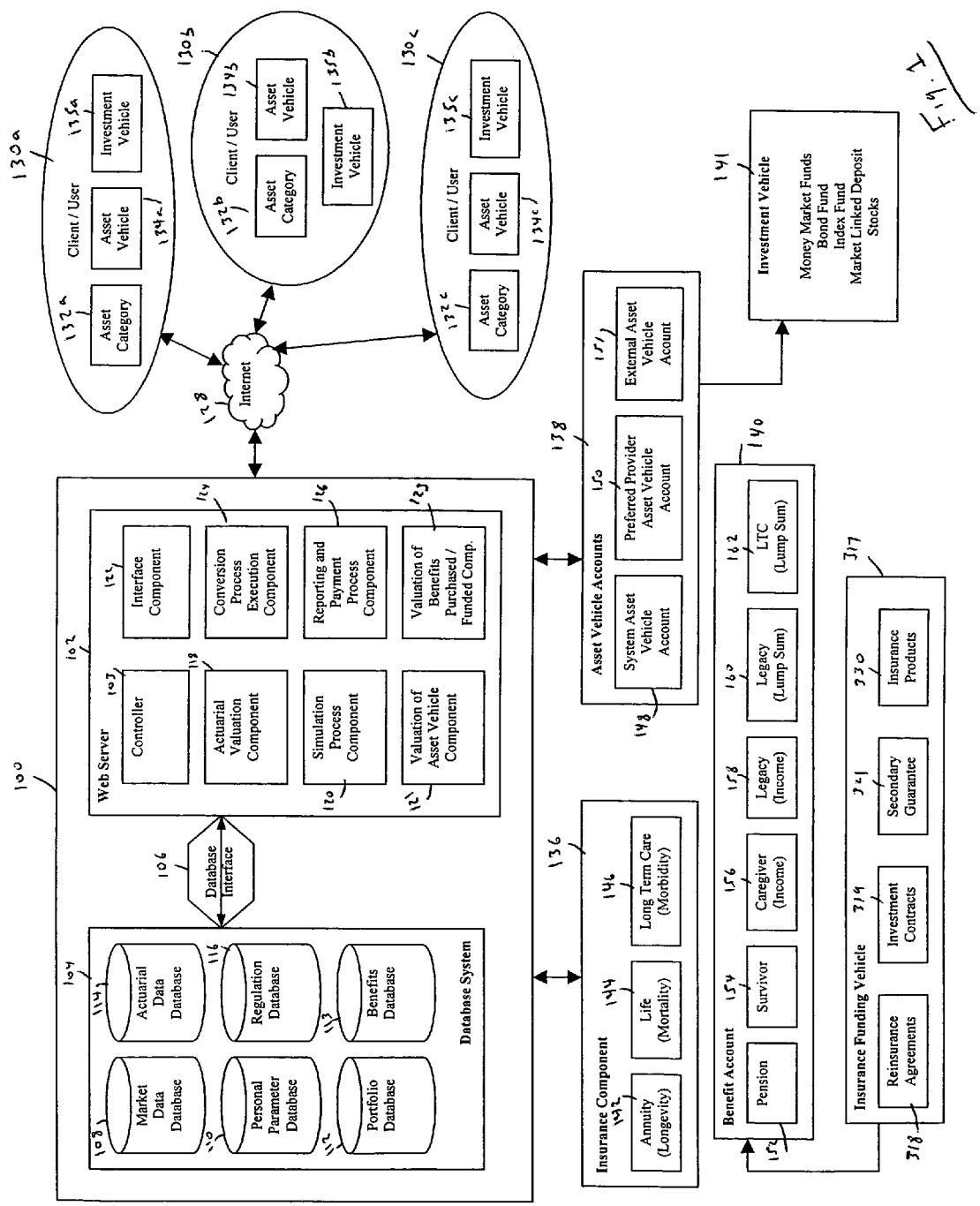
FIG. 1 shows a block diagram of the individual retirement income system of this invention, according to one embodiment.

With initial reference to FIG. 1, an individual retirement income system 100 is shown, according to one embodiment of the invention, for providing an Internet based computerized method for converting certain assets into secure retirement benefits. Essentially, retirement system 100 is configured to function as a retirement planning and implementation tool for individuals who have accumulated personal assets and are seeking secured or guaranteed lifetime benefits that they want during their retirement.

With continued reference to FIG. 1, retirement system 100 comprises a web server 102, a database system 104, and a database interface 106. Briefly, the retirement system comprises multiple components 118-126, employed via a controller system 103 according to one embodiment of the invention, for performing the valuations, simulations, conversions and other operations of the system of this invention, as will be described in more detail below.

Furthermore, database system 104 is configured to store data used by the retirement system, such as market data, actuarial data, client portfolios, etc. The web server typically accesses such data, via database interface 106, wherein the data is in turn manipulated by the above-mentioned components 118-126.

As mentioned above, retirement system 100 is configured to provide individuals with secure retirement benefits, preferably, based on an asset conversion process. According to one embodiment of the invention, the interaction between such individuals or clients and the retirement system is facilitated via Internet connection 128, wherein clients 130a-130c utilize Internet connection 128 to interact with system 100, and more specifically interface component 122.

Clients 130*a*-130*c* each comprise an asset category component 132*a*-132*c*, which corresponds to the accumulated assets they wish to convert. These assets may include various categories, such as qualified plans (e.g. IRA), home equity, annuity/life insurance products, personal equities and personal fixed income investments. One or a combination of these asset categories may have been converted to a corresponding asset vehicle component 134*a*-134*c*, which is the regulatory compliant vehicle from which the conversion process may be employed. Furthermore, asset vehicle components may further comprise a plurality of investment vehicle components, 135*a*-135*-c*, such as, money market funds, bond funds, index funds, market linked deposits and stocks.

It is noted that, according to one embodiment of the invention, clients 132*a*-132*c* can optionally transfer their assets to an asset vehicle account maintained and administered directly by the retirement system, or to a preferred provider asset vehicle account. Clients may also authorize retirement system 100 to oversee and maintain client's external asset vehicle accounts, such as 134, based on the client's instructions.

The retirement system is also coupled to asset vehicle accounts, such as 138 corresponding to each client, which comprises a set of asset vehicle accounts that can be monitored, maintained and administered by system 100. The types of asset vehicle accounts that may be controlled, maintained and administered in accordance with one embodiment of the invention comprise system asset vehicle account 148, referred to as GRC asset vehicle account, which is an asset vehicle account set up by the operator of system 100. Asset vehicle account 148 is fully controlled, maintained and administered by system 100.

Another asset vehicle account is a preferred provider asset vehicle account 150. A preferred provider asset vehicle account is controlled by a provider suggested by system 100 and selected by a client. System 100 may be authorized to execute transactions in account 150 on behalf of a client. Another asset vehicle account is an external investment vehicle account 151. External investment vehicle 151 represents a subset of asset vehicle accounts from a group of asset vehicles 134 wherein the client has authorized the system to control.

It is noted that each asset vehicle account is defined by an investment vehicle group, such as 141, which comprises various investment vehicles, such as money market funds, bond funds, index funds, market linked deposits, stocks and other types of investment vehicles. Thus, system 100 allows each client the flexibility to determine which portions of the individual's asset categories should be invested in various investment vehicles in order to accumulate for future funding of the desired benefits. It is noted that in the present context the term funding benefits or purchasing benefits have been used interchangeably.

Figure 2:
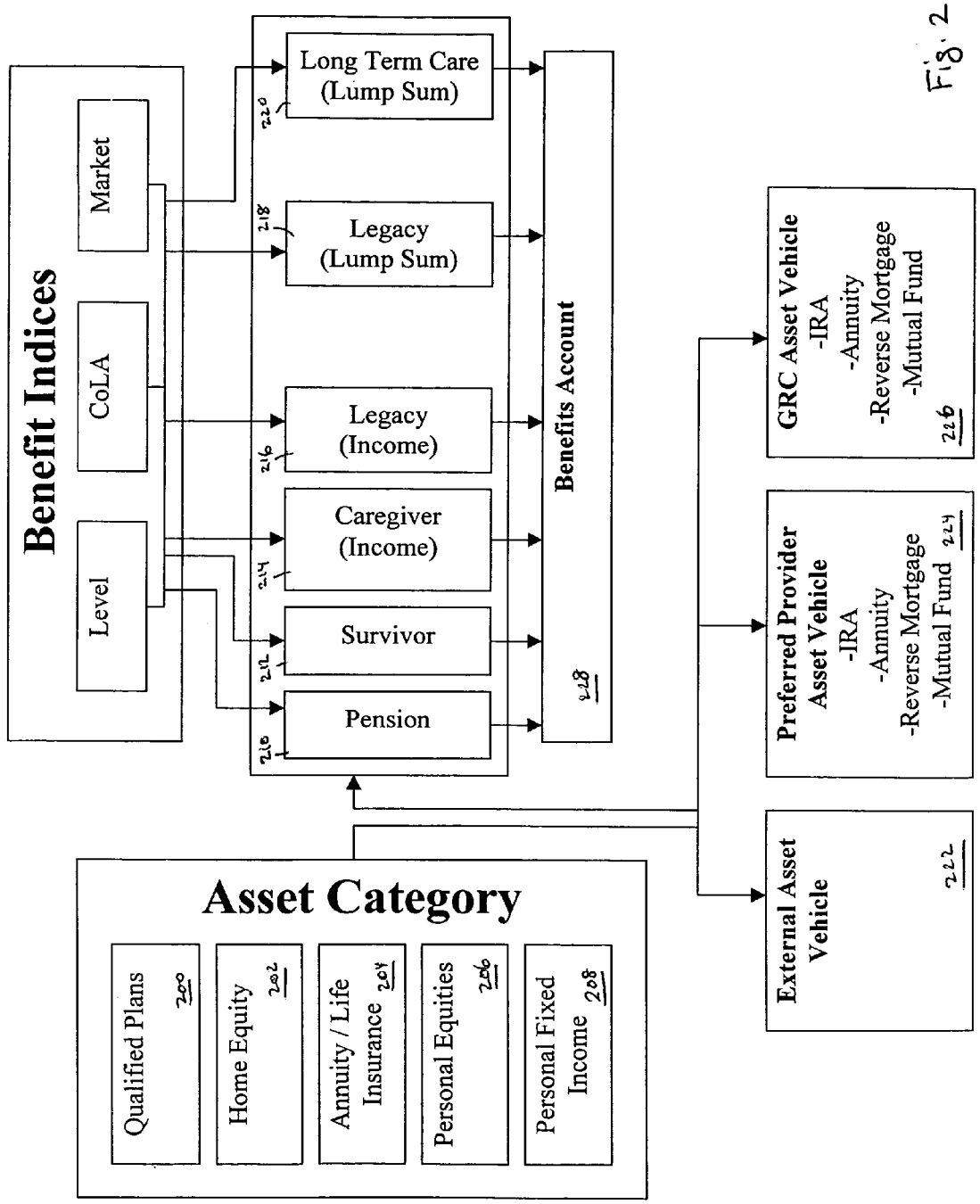
FIG. 2 shows a more detailed view of the individual asset categories, asset vehicle accounts, investment vehicles, and benefit vehicles available via the system of this invention, according to one embodiment.

In accordance with one embodiment of the invention, each client has the choice to employ one or many of the asset vehicle accounts described herein. To this end, system 100 maintains an asset vehicle account component 138 corresponding to each of the clients employing the system. The concepts behind the asset categories, asset vehicles and investment vehicles introduced above is also illustrated in FIG. 2 as will be described in more detail.

Retirement system 100 is further coupled to insurance component 136, which represents a plurality of actuarial information to allow system 100 maintain an up-to-date actuarial data database. These actuarial information preferably correspond to the benefits offered by the system of this invention. To this end insurance component 136 includes actuarial data corresponding to longevity statistics 142 for evaluating lifetime income benefits. Insurance component 136 also includes actuarial data corresponding to mortality statistics 144 for evaluating life insurance benefits. Insurance component 136 also includes actuarial data relating to morbidity statistics 146 for evaluating caregiver long term care benefits. It is appreciated by those skilled in the art, that for each category of statistics described herein, there may be additional statistical information concerning joint survivorship. This additional information is relevant when client's desired benefits include joint survivorship type arrangements.

FIG. 1 also illustrates a benefit account component 140, corresponding to each of the clients such as 132. Thus, in accordance with one embodiment of the invention, system 100 offers a personalized benefit account, such as 140, to each of the clients based on, among other things, client's asset categories, investment selections and desired benefits. Each benefit account 140 comprises a plurality of benefit components referred to as benefit vehicles. For example, in accordance with one embodiment of the invention, a benefit account is defined as a combination of one or many benefit vehicles, such as pension benefit 152, survivor benefit 154, caregiver (income) benefit 156, legacy (income) benefit 158, legacy (lump sum) benefit 160 and long term care benefit 162.

It is noted that in accordance with various embodiments of the present invention, for each benefit account the benefit vehicles may be provided by a plurality of different means. For example, all or some of the benefit vehicles may be supported by a benefit funding vehicle 317, which comprises a plurality of different components. For example, benefit funding vehicle 317 includes reinsurance agreement component 318, investment contract 319, insurance products 330 and secondary guarantee agreement 321.

Thus, an employer may set up the benefit accounts for each client/employee, and use the funds from the investment vehicles designated by the client, to provide the benefit vehicles in each benefit account. These funds from the investment vehicles may be provided via investment contracts 319 purchased by the employer providing the benefit account. Typically, such funds are reinsured in secondary markets via reinsurance agreements 318.

In other embodiments, for example, all or some of the insurance vehicles may be provided by purchasing existing insurance products 330. In other embodiments, a benefit account can be directly underwritten by an insurance company based on the desired benefits.

Secondary guarantee agreement 321 provides an added security to a client, albeit at a premium to guarantee the minimum level of benefit at a future date, even when client's assets are invested in equity type investment vehicles, such as stock or index funds.

As will be explained in more detail below each benefit vehicle in a benefit account can be separately valued based on the actuarial data employed by system 100. The value of the benefit account will then correspond to the sum of values corresponding to each of the benefit vehicles. This feature allows for a unique flexibility in reevaluating the benefits provided by a benefit account and changing the amount of each benefit based on change in circumstances.

These benefit accounts in turn provide benefits to clients 130*a*-130*c* in the form of benefit distributions, satisfying their retirement objectives. Thus, according to one embodiment of the invention, clients 130*a*-130*c* can access retirement system 100 in order to easily and efficiently plan and secure their retirement.

In the embodiments where the clients' asset is converted to an asset vehicle account, a client may identify tax-qualified assets and convert them into an individual retirement account (IRA) asset vehicle. Of course, it is understood that the system of this invention can be configured to operate without regard to tax consequences as well.

Once the client has identified the desired asset vehicle accounts and corresponding investment vehicles, he or she then accesses the interface component of web server 102, via Internet connection 128. Interface component 122 provides the necessary interface elements for user interaction between the client and the retirement system. For example, interface component may comprise web pages, Java scripts, logon and password protection, etc. Also, interface component 122 is configured to query the client with a plurality of benefits questions, as will be described below. The benefit questions correspond to decisions made by the client that help determine the retirement benefits the client desires as well as the client's health, risk tolerance, survivor needs, etc. Collectively, these decisions determine the benefit account desired by the client. Furthermore, the system provides the client with a choice of conversion periods during which client's assets can be allocated to fully fund the various benefits that he or she selects. Interface component may also provide clients with on-line access to retirement counselors who may be available to answer client's specific questions. This feature may be in the form of on-line text or video communication, in accordance with one embodiment of the invention.

During the interactive process between the client and the system, other components of system 100 are employed as well. These components may assist the individual with the selection of a retirement benefit account by portraying the risks and/or simulating statistical outcomes. Illustratively, actuarial valuation component 118 is employed to determine the value of various benefit vehicles as selected to be included in a client's benefit account. Actuarial valuation component 118 employs the statistical information on mortality, morbidity, and longevity as provided by component 136 in order to price the retirement benefits that will be offered to the client.

System 100 also includes a simulation process component 120, which is employed to generate a statistical analysis based on a series of simulations of a sample retirement conversion plan so that the client will have an idea of the risks and benefits of the benefit account he or she is designing.

System 100 also includes a conversion process execution component 124, which is employed to commence an actual conversion process. As will be explained in more detail below, the system of this invention is configured to take funds from asset vehicle accounts and allocate them towards desired benefits over a conversion period as specified by a client. This conversion period allows the client to maintain liquidity as well as participate in the potentially high return of the stock market or other investment vehicle, for example, by not immediately 'locking' all the assets into a particular benefit account. Rather, the assets are gradually converted to a retirement benefit account over a period of time on a gradual basis. It is the client's decision, based on his or her risk tolerance, to determine the length of the conversion period and the amount of funds to keep in higher risk investments.

Reporting and payment process component 126 is employed to process the payments to the client both during the conversion period and after the conversion period. Component 126 also updates the client on the performance of his or her investment vehicles and benefit account as well as the performance of the markets, rate of inflation, interest rates, among other things, so that the client can modify his or her investment vehicles and benefit account with an informed state of mind. The reporting process component is also configured to provide tax and regulatory reporting to the appropriate agencies as needed.

System 100 also includes a valuation of asset vehicle account component 121, which is employed to determine the market value of various asset vehicle accounts for each client that are tracked and may be controlled, and/or maintained and administered by system 100. This valuation provides information to the client, for example, to determine the amount of funds available to purchase various benefits.

System 100 also includes a valuation of benefit vehicles component 123, which are purchased or funded for the client. Component 123 is employed to evaluate the market value of various benefit vehicles that form the client's benefit account. As will be explained in more detail below, system 100 employs this valuation of benefit vehicles, to allow the client the flexibility of changing the benefits allocated to each benefit vehicle based on client's change of circumstances and desires over time.

Database system 104, as described above, is configured to store data that is in turn accessed and manipulated by the individual components of system 100. Specifically, market data database 108 stores statistical market information as well as actual market information, which is used by simulation components 120 and conversion process component 124 to provide statistically accurate simulations and correctly priced execution of the conversion process. For example, a benefit provided by a benefit vehicle, such as a pension benefit, may be valued based on the current interest rates as stated by the market data database. Also, during the conversion process, sufficient information may be offered to the client based on past performance or the current economical environment of the market as reported by market data database so as to allow the client to make more informed decisions.

Portfolio database 112 stores information and data regarding the asset vehicle accounts of each of the plurality of clients. This information is used when calculating the remaining asset value that has yet to be converted as well as the amount of money available that can provide income support to the client on an annualized basis. According to one embodiment of the invention, the client must continuously update the portfolio database, including the asset vehicle account data, so that the database information remains current. This is particularly necessary where the client is personally managing the assets and the system has no method for calculating up-to-date asset vehicle account balances.

Benefits database 113 stores data relating to the client and benefits selected by the client. For example, database 113 stores information, such as market value, concerning the benefits acquired by the client, which are purchased or funded via the system. This information is stored every time valuation of benefit component 123 calculates the market value of the various benefit vehicles that form a client's benefit account.

As mentioned earlier, a clients' needs and benefits may change over time and as such the system may update database 113 by allowing the client to interact with the system via the interface component so as to modify his or her benefit choices. When purchasing benefits via benefit vehicles and distributing these benefits, the retirement system of this invention interacts with database 113 to access the client's information in order to act accordingly. For example, if the client increases his or her annual income needs, the system may respond by purchasing for example, a larger pension benefit and/or deducting more funds from the client's asset vehicle accounts. In reevaluating the funds necessary to purchase additional benefits, the system employs, among other things, the benefits database.

Personal parameter database 110 is configured to store each client's information necessary to purchase or fund benefits that are selected or later modified by the client. This information may include client's age and health status, a desired conversion period specified by the client, the asset accounts and investment vehicles that the client has authorized for the system to employ towards funding the desired benefits, the benefit indices that a client would like to employ when obtaining any one of the benefits, information on survivors and the managed income range, referred to as collar, for certain benefits chosen by the client, which is a percentage spread up or down from a desired benefit within which client is willing to accept, as will be explained in more detail in an exemplary embodiment in reference with FIG. 4.

Actuarial database 114 is used together with market data database to enable system 100, and specifically actuarial component 118 to calculate the actuarial information necessary to compute the value of the benefits that are provided through the benefit vehicles that form the benefit account of a client. For example, the value of a pension or survivor benefit may be based on the client's (and spouse's) mortality data as retrieved from the actuarial database. The value of a long term care benefit, on the other hand may be based, among other things, on the morbidity data as retrieved from the actuarial database.

Regulation database 116 stores information relating to all regulations that govern the purchase, valuation and distribution of benefits corresponding to each of the benefit vehicles. This information may include federal and local government regulations that may affect the valuation of various benefits selected by the client. It may also include regulations governing tax consequences for using or selling a particular asset. In addition, the regulation database provides the data necessary for regulatory reporting.

With reference to FIG. 2, an exemplary illustration of the various types of asset categories, asset vehicle accounts, investment vehicles, and benefits provided by benefit vehicles of a benefit account that can be provided by the system of this invention is shown, according to one embodiment of the invention.

Asset categories, such as asset categories 200-208, correspond to the various categories of assets that an individual or client has accumulated in the past or expected to accumulate in the future. As shown in FIG. 2, such asset categories may include (1) qualified plans category 200, corresponding to tax or retirement qualified assets of the client, (2) home equity category 202, corresponding to the asset value of the client's residence or other real property, (3) annuity/life insurance category 204, (4) personal equities category 206, and (5) personal fixed income category 208.

Typically, when an individual retires, he or she may utilize one or more of the above mentioned asset categories, for example, (1) to purchase lifetime income via an annuity, (2) to purchase a long term care agreement, or (3) to purchase a life insurance policy that leaves a legacy to the client's heirs. It is usually the case, however, that personal needs and objectives change over time, whereas the client may realize, for example, that extra income payments are needed for a spouse, or that leaving a legacy is no longer desirable. Unfortunately, after locking in to various insurance products, it may be too late or too costly to alter one's retirement plans at this point.

In addition, the personal investments of a client may be performing well at retirement and the client may be conflicted between the choice of continuing to benefit from returns on equity investments, which may later increase retirement benefits and legacy amounts, or 'locking' into a secure, but potentially less rewarding, retirement plan that offers a stable low risk result.

The system of this invention provides a solution, by first providing a benefit account that comprises a plurality of various benefits that can be flexibly adjusted by the client, while at the same time reducing risk by gradually converting assets into secure benefits. It is noted that a client may also choose a plurality of conversion periods for each of the benefits required. Thus, the recurring conversion process is facilitated in a manner that enables the individual or client to select desired benefits, offering the ability to modify or adjust those benefits as needs change. Indeed, the system encourages client participation and modification on a recurring basis, as the circumstances of a client changes. However it is noted that for some of the benefits the system may require proof of insurability whenever a change or modification in the benefit account is required.

In contrast, insurance products offered by the prior art typically operate via one-time purchases, where the distributions or benefits provided by those purchases cannot be changed as needs change. Also, once the client has made his or her purchase with such prior art insurance products, there is usually no incentive for the provider to follow up with the client since the sale has already been executed. Clients need a retirement benefit account 228, such as one offered by this system that revolves around satisfying their continuously changing benefit needs. The benefit account, such as 228 as mentioned above, satisfies clients' needs for flexibility and choice of benefits.

It is noted that the benefit account, such as 228, acquired by each client remains flexible even when the entire client's investment vehicles have been mapped to various benefits after a conversion process. Thus, during any time that a benefit account is maintained for a client, it is possible to change the benefits acquired within that account. However, it is appreciated by those skilled in the art that because of regulatory and actuarial limitations, there may be threshold limits beyond which a benefit cannot be modified.

The conversion process involves the gradual transfer over a conversion period, of assets from an asset vehicle account into a benefit account with various allocated benefits provided via benefit vehicles. As such, according to one embodiment of the invention, the retirement system employs the asset vehicles of each client in order to more easily facilitate the transfer of one asset to another, such as with asset vehicles accounts 224 and 226. Of course, the client may maintain his or her control of the asset vehicle, such as with asset vehicle account 222, and simply sell or transfer assets based on the information provided by the retirement system.

Some examples of asset vehicle account include individual retirement accounts (IRA), personal investment accounts, reverse mortgage accounts, etc., as will be explained in more detail in reference with FIG. 2. Examples of investment vehicles include (1) stocks, (2) money market funds, (3) bond funds, (4) index funds, and (5) market linked deposits.

The objective of the retirement system of this invention is to provide the client with his or her desired personalized benefits. The system purchases specific benefits with the various investment vehicles as specified by the client during the conversion process. Such benefits include, (1) pension benefit 210, (2) survivor benefit 212, (3) caregiver income benefit 214, (4) legacy income benefit 216, (5) legacy lump sum benefit 218, and (6) long term care (LTC) benefit 220. Thus, clients approach the system of this invention with a plurality of asset categories, wherein the system converts those asset categories into liquid or tax appropriate asset vehicle accounts that include various investment vehicles. Thereafter, the investment vehicles are converted into a benefit account with benefits over a predetermined conversion period. This allows the individual to participate in higher yielding investments as well as modify the previously selected benefits during and after the conversion period.

It is noted that the system also allows the client to employ various benefit indices, such as level, COLA and market linked as is known to those skilled in the art, in purchasing or funding the desired benefits that are available via the benefit vehicles.

Figure 3:
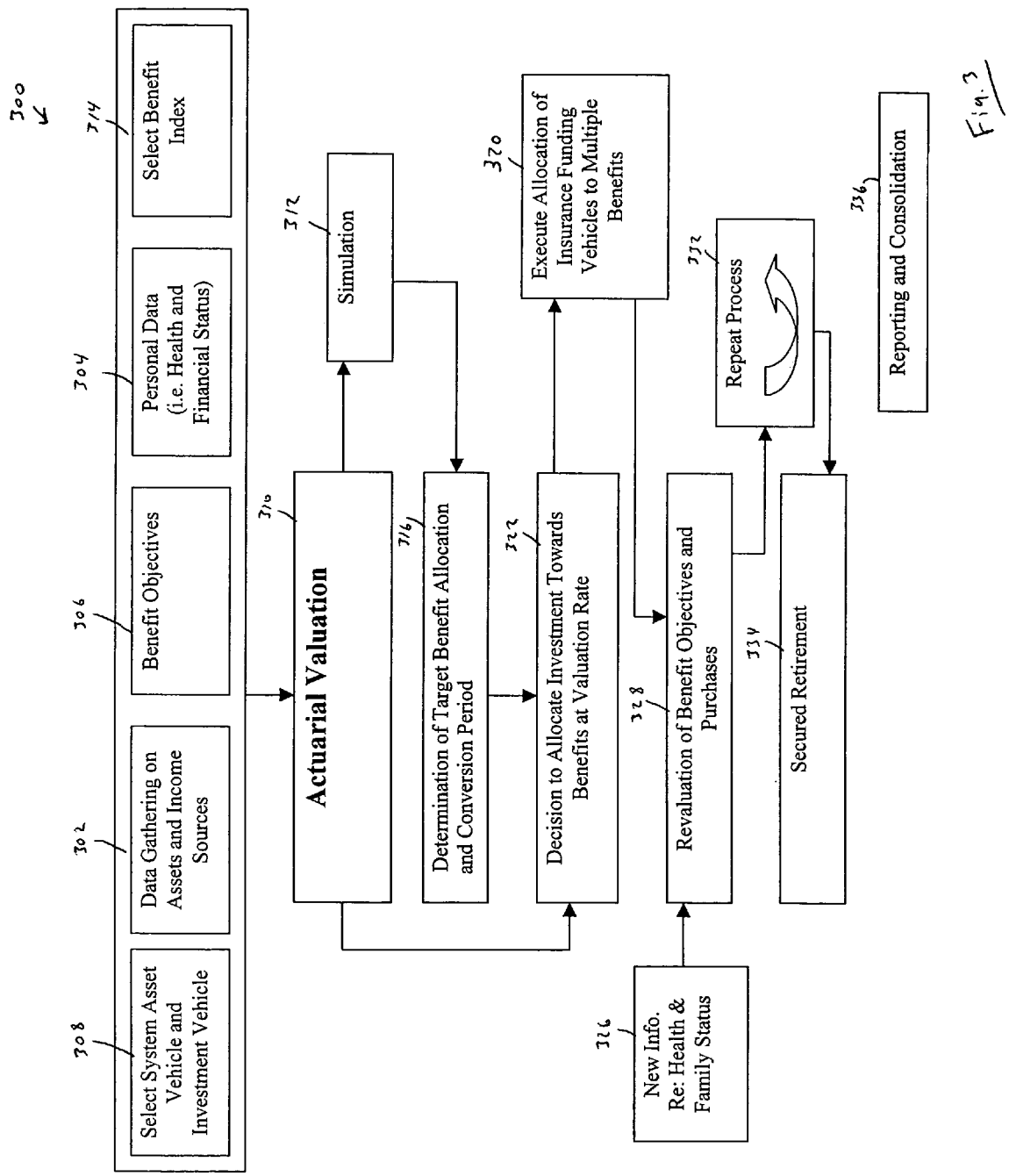
FIG. 3 is a flow diagram that illustrates the steps that may be performed during the conversion of assets into benefits via the system of this invention, according to one embodiment.

Accordingly, with reference to FIG. 3, a flow diagram 300 is shown, illustrating via stages 302-336, the overall flow of the retirement system of this invention as well as the underlying process of converting assets into secure retirement benefits, according to one embodiment of the invention.

Initially, at stage 302, the system gathers data on the assets and income sources of a client and stores that information in portfolio database 112 (FIG. 1). The data is first used by the system to evaluate the characteristics of the assets that the individual currently owns, as well as income sources, in order to determine the client's financial situation. For example, the asset data is reviewed to determine the risk level of owned assets, as well as current yield offered by such assets and their level of liquidity. At stage 302 the system also gathers data about various investment vehicles that a client holds within various asset vehicle accounts. Also evaluated at this stage, based on the gathered assets, are tax treatment, to verify which of the client's assets are eligible for tax free conversions within the retirement system. The client may also provide sources of income to enable the system to compute any shortcoming between current income and the client's income objective.

At step 304 the system queries the client concerning the personal data including age, health and family status, so as to complete the client's profile and store that information in personal parameter database 110 (FIG. 1). At this stage, the system may provide product education to the client including the advantages of establishing a benefit account with its various benefit components that can be flexibly adjusted over time. The system also provides information relating to possible advantages of employing a conversion period for acquiring desired benefits so as to allow client's investment vehicles remain invested in the market as desired by the client. The system also develops the client's risk profile, such as the client's tolerance for market risk, inflation risk and long term care risk.

At step 306 the system allows the client to specify the various benefits that the client desires based on the client's needs. Preferably, the system goes to this step, after the client has obtained information and education about various benefits that a client may need during the retirement period. For each desired benefit, client also specifies, if known, the amount of the benefit desired. The information gathered in step 306 is then stored in benefit database 113 (FIG. 1).

The system at steps 304 and 306 directs the client through an interactive process, via interface component 122 (FIG. 1) for example, wherein the system aims to educate the client as to what they may want in a retirement program. Ultimately, the client completes the interactive process by providing the system with personal data, retirement objectives, annual income needs, as well as other necessary information.

It is noted that system 100 is employed to provide a benefit account for each client that has various benefit vehicles based on client's target benefits corresponding to each category of benefit. For example, after receiving information about various benefits and types of available benefit indices corresponding to each benefit, a client may determine that there is a need for a certain amount of lifetime pension benefits, survivor pension benefits, caregiver monthly benefits in the event of a sickness, legacy income benefits payable to children or grandchildren for a certain period of time, legacy lump sum payment to beneficiaries, and long term care payments in the event of a need for long term care.

At steps 308 the client decides what asset vehicles accounts and corresponding investment vehicles to employ as discussed above. The information obtained in step 308 is then stored in portfolio database 112 as explained before. At step 314 the system allows the client to select the benefit index for the retirement investments. A selection of benefit indices may include level, COLA, and market linked, as is commonly understood to those skilled in the art.

Once the above-mentioned steps are executed, the system goes to step 310 to conduct an actuarial valuation for each of the benefits selected by the client. The system employs actuarial evaluation component 118 (FIG. 1) to accomplish the task of benefit valuation for each of the benefits desired by the client. The system employs the actuarial data stored in database 114 and updated via insurance component 136. The system also employs regulation database 116 in calculating the value of each of the benefits desired by the client, as explained before in reference with FIG. 1.

At this stage, the client may decide to set up a benefit account based on the valuations of various benefits that were selected by the client. Thus, the system may go to step 322 to allow the client to indicate the decision to allocate investments toward the entire amount of desired benefits at a current valuation rate as computed at step 310. The system then goes to step 320 to execute the allocation of insurance funding vehicles 318 (FIG. 1) to multiple benefits as desired.

Therefore, at step 320, the system allocates the client's authorized investment vehicles to purchase each of the benefit vehicles provided by the system. Thus, the client ends up with a benefit account that has various benefits each of which have been evaluated by the system based on the information stored in the system's database.

If however, after step 310, a client decides to obtain the desired benefits over a specific period of time referred to as the conversion period, the system provides additional information to the client to enable more informed decisions. As stated before, a client may wish to participate in the returns from his/her investment vehicles before locking into a benefit account all at once.

It is noted, as mentioned above, that the system of this invention, according to one embodiment, is configured to simplify for the client the often-complex aspects of purchasing insurance benefits. In fact, in order to achieve all or most of the objectives of the client, this system may allocate many benefits over an extended period of time, often recalculating actuarial valuations. The system is configured to handle such activity by providing to the client a view of a retirement benefit account that as a whole can provide many benefits, including income, long term care, legacy, etc. The client is also offered the ability to gradually convert his or her assets to retirement benefits over a predetermined conversion period, rather than at once in one lump sum. This enables the client to modify the previously selected benefits as well as maintain significant positions in potentially higher yielding investment vehicles.

Furthermore, advantageously, the client may instruct the system to maintain a predetermined proportion of assets in various investment vehicles. For example, the client may decide that 50% of the value of the assets should be invested in equity investment vehicles, such as stocks, and the other 50% of the value of the assets should be invested in bond funds. Thus, the system recalculates the value of the investment vehicles so as to maintain the desired proportion of assets, every time that it allocates funds towards the purchase of benefits.

It is noted, however, that since some of the assets of the client are being kept in the stock market or other potentially volatile investment vehicles, there is no guarantee that the retirement objectives initially selected by the client will be achieved. For example, the client may lose a significant portion of money during a stock market correction and may thereafter not have sufficient funds to purchase the remaining retirement benefits that are needed to supply all of the desired benefits. In response to this risk factor, the system is configured to provide a simulation of the expected outcomes and the chances of the client achieving the desired outcome over a desired conversion period.

Thus, at stage 312, the system employs simulation process component 120 (FIG. 1) to simulate various scenarios of investment and allocation to various benefit vehicles during various conversion periods. The results of each one of these scenarios is then provided to the client.

The process and algorithm behind this simulation will be discussed in more detail with reference to FIG. 5. Briefly, the system retrieves statistical data estimating the likely market performance and interest rate levels for a future conversion period. Then, based on the investment vehicles employed by the client and other client profile information, the system calculates a plurality of scenarios of what may happen with the client's investment vehicles and desired benefits over the specified hypothetical conversion period. Statistics are offered to the client, detailing his or her chances of achieving the desired objective. For example, the system may inform a client that based on a particular scenario there is a certain percentage of likelihood that the client can achieve 100% of its desired benefits, and that there is a certain percentage of likelihood that the client can achieve more than 100% of its desired benefits or less than 100% of its desired benefits, as described in more detail in reference with FIG. 6.

The system then goes to stage 316, after the user is satisfied with the simulation and other statistical charts. Thus, based on the information provided to the client as the result of the simulations performed by the system, a client determines the desired target benefits for each of the benefit vehicles offered by the system and a desired conversion period within which the client's benefit account is to be funded.

During the conversion process the system periodically transfers assets from the client's investment vehicles for use to obtain one or more insurance benefits that over time will accumulate to a target benefit. Accordingly, at every interval of the conversion process, for example once a year, an additional portion of the client's investment vehicle is allocated towards one or more insurance benefits. It is noted that a client may specify a target benefit with a percentage spread (collar) below and above the target benefit. For instance, a client who is interested to receive a specified target income payment during the conversion period may specify a 10% collar, meaning that benefit payments that are 10% below or above the target benefit are acceptable.

Thus, at step 322, for the situation where a conversion period is employed, the system determines the amount of the client's investments to allocate towards benefits at valuation rates during the beginning of each interval during the conversion period. According to one embodiment, the allocation amount towards obtaining benefits represents a portion of benefits proportionate to the time remaining in the conversion period. For example, if a conversion period of ten years is selected, then 10% ($1/10^{th}$) of the benefits are purchased for the first year, and $1/9^{th}$ of the remaining benefits for the next year, and so on. Similarly, if a fifteen-year conversion period is selected, then a $1/15^{th}$ portion of the benefits is purchased for the first year, and so on. However, as will be described below, any portion of the client's assets can be allocated towards various benefits during each interval.

Each time that it is necessary to evaluate a purchase for a desired benefit, the system employs the valuation of benefits purchased component to determine the value of the benefits purchased to date so as to calculate the amount of remaining benefits required to purchase. The system also employs valuation of asset vehicle component 121 to determine the amount of assets remaining to purchase the desired benefits. Also, the client may use market data to decide how and in what fashion to structure the remaining allocation of investments towards obtaining additional benefits. For example, as will be explained in more detail below, a client at any time during the conversion period, after a satisfactory growth in the assets may determine that the entire asset should be used to purchase a benefit that is satisfactorily higher than the original target benefit. Also, a client who experiences adverse market results in his investment vehicles during the conversion period may employ a stop/loss indication arrangement, to lock in the remaining assets and prevent further depreciation of his or her assets, when the value of the investment vehicles have decreased to below a predetermined stop/loss threshold value.

At step 320, once the amount of investments to be allocated towards various benefits is determined, the system secures the benefits by allocating the insurance funding vehicle 317 (FIG. 1) to multiple benefits in benefit account 140 (FIG. 1). In one example, the system instructs an insurance company to provide an insurance product associated with a benefit that is provided by the system. At this point, the insurance company generates all the documentation for delivery to the client. The operation of this exemplary arrangement is described in more detail in reference with FIGS. 7a and 7b.

At steps 326 and 328, the client returns to the system on a regular basis during and after the conversion period and modifies his or her benefits and objectives if necessary. The system then proceeds with a revaluation and modifies the remaining portion of the conversion process as needed. For example, at step 326 the client may provide new information relating to health and family status, which may require a reassessment of the types of benefits that the client has previously purchased.

Thus, the client may increase one of the benefits, for example desired pension payments and decrease another benefit, for example survivor pension benefits. The system at step 328 performs an actuarial valuation corresponding to the changes required. The system looks at the market value of the purchased benefits, at the actuarial data and at the interest rate to determine the value of the benefit that is being decreased in one benefit vehicle and also to determine the value of the benefit that can be purchased in exchange in another benefit vehicle. This reevaluation can occur during the conversion period or after the conversion period. If it occurs during the conversion period, the system needs to readjust the remaining purchases of the benefits based on the changes made by the client. As mentioned above, this feature of the system provides for a remarkable flexible benefit account, wherein individual benefits in the account can be adjusted, additional benefits can be purchased or completely exchanged for other benefits, the amount of payments to purchase a benefit can be adjusted based on market conditions, while allowing the client to choose appropriate benefit indices for each benefit vehicle in the benefit account. Stage 332 illustrates that the process of updating benefits and revaluation of the conversion process is repeated on a continuous basis.

At step 334, once the conversion process is complete, the client enters the secure retirement stage, where all designated investment vehicles have been converted to benefit vehicles. Notably, as described above, it is the decision of the client as to the length of the conversion process and when to 'lock in' to secure products. Once assets are converted to the secured retirement stage, however, according to one embodiment of the invention, the client can still modify the various benefits as explained above. Finally, at step 336 the system provides any reporting that is necessary.

Figure 4B:
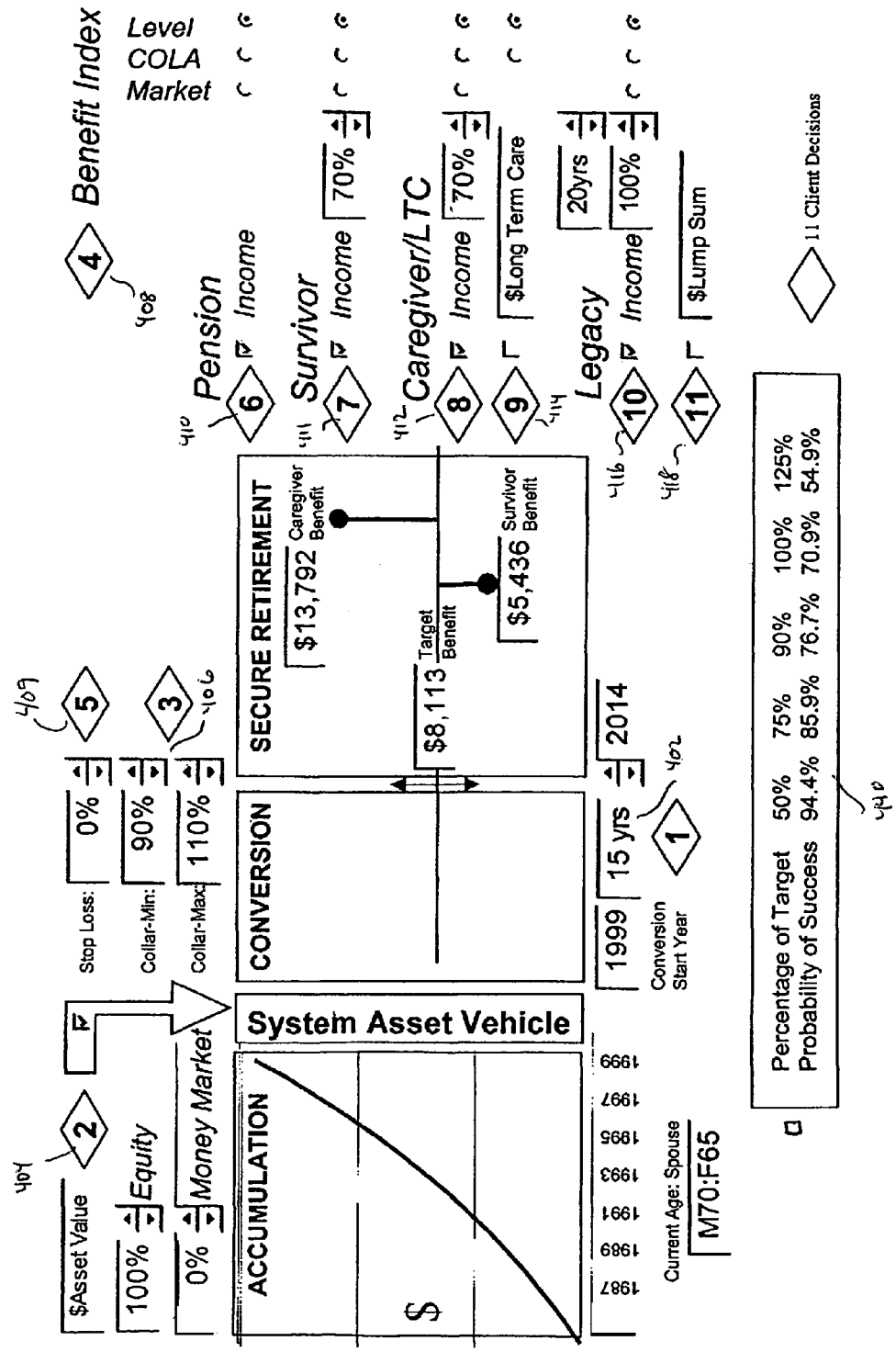

With reference to FIGS. 4a and 4b, the actual decisions available to the client, according to one embodiment of the invention, are shown on a decision matrix table 400. According to one embodiment, these decisions can be responded to at various intervals, illustrated in FIG. 4a as intervals A-G, wherein G is the final interval or status when a final choice for all decisions must be selected in each round. It is understood, of course, that the system of this invention can be employed with more or less decisions. Also, there may be default responses to one or more of the decisions, referred to in the drawings as "def." notation, so that client's are not required to provide input for every decision. According to one embodiment, a unique set of decisions, referred to in the drawings as "dec." notation, are provided for each client depending on his or her circumstance, profile, or investment needs, etc.

As described above, the retirement system determines the retirement objectives and desired benefits of the client via a plurality of queries. According to one embodiment of the invention, as shown in FIG. 4a, these queries comprise several types of decisions that the client may respond. As mentioned above, and as shown in FIG. 4a, default responses (def.) can be provided for clients who do not have a response or are otherwise not capable of responding to one or more of the decisions.

Briefly, conversion period decision 402, requires the client to decide the length of the conversion period for which the investment vehicles are to be converted into retirement benefits. A client that is more comfortable with risk may choose a longer conversion period in order to participate in the market or to provide a longer period of time to modify the selected benefits. Also, depending on the benefits or required income chosen by the client a different conversion period may be more appropriate. Furthermore, a client may set a different conversion period for each one of the benefits desired.

Asset decision 404 corresponds to the decision as to what type of asset vehicle accounts and investment vehicles for each asset vehicle account will be maintained during the conversion period. First, the client must decide if the retirement system will manage the asset vehicle accounts or whether he or she will manage them personally, etc. Second, the particular investment vehicle where the assets will be invested must be chosen. And third, the percentage of the total asset in each investment vehicle is chosen. For example, as mentioned before, a client may decide that a certain percentage of the value of his assets should be maintained in equity investement, such as stocks and a certain percentage of the value of his assets should be maintained in fixed income vehicles, such as money market funds. The system then maintains the same percentage of the value of the assets, in each investment vehicle, every time that a portion of these investment vehicles are allocated towards a purchase of a desired benefit.

Collar decision 406 is the percentage spread below or above a target benefit from which the client's income can fluctuate during the conversion period. Typically, the higher the spread the more likely that the client's final retirement objective will be achieved. For example, during a bad stock market year the client's investments may not have appreciated enough to supplement the client's income. If the client decided on a 90% collar, then the system will distribute a reduced 90% income for that year, saving the remainder to be invested for future years. Similarly, if the stock market performs well for a given year, the client may limit his income to a 110% collar, so that any extra asset appreciation will continue to derive potential benefit from the market.

Benefit index 408 provides the client with the type of benefit indices desired for each of the benefits selected by the client. Thus each benefit vehicle may be tied to a particular benefit index such as a COLA plan, a level plan and a market linked plan as is known to those skilled in the art.

Stop/Loss indication 409 provides the client with the ability to accelerate the entire conversion process at any time when the market value of the investment vehicles has reached a predefined high or low level. Thus, a client can specify to accelerate the entire conversion when the market has gone satisfactorily high, or when the market value of the investment vehicles has gone so low that may jeopardize the amount of benefits the client can eventually purchase. It is noted that in one embodiment of the invention, the stop/loss indication 409 can be set to the collar limits set by decision 406.

Pension decision 410 corresponds to the selection of pension payments during the client's lifetime. Survivor decision 411 corresponds to the selection of benefits that are needed for one's spouse. Typically, this decision will determine whether the survivor of two individuals participating in the retirement plan of this invention will receive the same income as when both were alive or rather a reduced income. Illustratively, a client may decide that income payments of $1,000 per month are needed, for example. Yet, if one spouse passes away, then income payments of only $700 per month are needed for that remaining spouse. The system of this invention can be configured to handle the conversion process differently, and/or modify the benefit account accordingly, depending on the needs of both spouses as well as the survivor spouse.

Caregiver decision 412 and long term care agreement decision 414 query the client whether he or she wishes to have a guaranteed care reimbursements arrangement, etc. where the corresponding benefit vehicle provides payments for such care support if needed at a later date. If selected, the system may then allocate or fund a long term care benefit or other related benefit vehicle within the client's benefit account.

Similarly, legacy income decision 416 and legacy lump sum decision 418 query the client whether he or she wishes to have a guaranteed legacy provided to his or her beneficiaries in the form of a lump sum or income payments. Here too, if selected, a corresponding insurance benefit may be allocated within the client's benefit account.

It is understood, according to another embodiment of the invention, that there may be more or less choices/decisions provided to the client. For example, the client may be queried about his or her risk tolerance so that information relating to various conversion periods can be provided to the client.

Thus, FIG. 4b illustrates an exemplary client interface wherein the decisions described in FIG. 4a can be provided to the system in the form of a series of "what if" scenarios. Therefore, a client can modify any of the decisions stated before and see the amount of benefits, referred to as target benefits, that will be available if the client establishes a benefit account wherein the client's entire investment were to be allocated towards the purchase of benefits immediately. The client also can see the results of a simulation to determine the probability distribution for the amount of benefits that may be available at the end of a desired conversion period.

In the example illustrated in FIG. 4b, based on the decision information provided by the client, a pension benefit of $8113, a survivor benefit of $5436, a caregiver benefit of $13792 will be available if the client allocates the entire funds in the assigned investment vehicles toward the purchase of the desired benefits.

At this point, the client can also find out the probability of success that these target benefits will be achieved at the end of the 15 year period, by clicking over a button 440 that instructs the system to illustrate the probability of success results. For example, the system in response to clicking button 440 may provide a separate screen illustrating that there is a 94.4% chance that 50% of the target benefits will be achieved, that there is a 85.9% chance that 75% of the target benefits will be achieved, that there is a 76.7% chance that 90% of the target will be achieved, that there is a 70.9% chance that 100% of the target will be achieved and there is a 54.9% chance that 125% of the target benefits will be achieved. As will be explained in more detail in reference with FIG. 6, the probability of success results may be illustrated in the form of probability charts. Furthermore, for different asset vehicles selected by the client, a different set of probability results may be provided.

With reference to FIG. 5a, the algorithm used to process the simulation, as described above, with respect to one of the benefits mentioned above, i.e. pension and survivor benefit, is shown as a scenario simulation table 500. It is noted that table 500 also illustrates an exemplary real life scenario of the conversion process in accordance with one embodiment of the present invention. It is noted that this conversion process is only an example employed by system 100 to obtain pension benefits over the conversion period, and is described herein to explain some of the principles of the present invention.

A brief explanation of the financial basis underlying the retirement benefit offered by the system of this invention may be helpful at this point in understanding the operation of the simulation algorithm, as well as the actual execution of the conversion process.

In the example of simulation table 500, as shown in table 502, a prospective client, having an initial asset value of $100,000, approaches the system in order to create a secure retirement benefit In this example, the client may need retirement income for himself, a 70 year old male, as well as his spouse, a 65 year old female, who are both in good health. In addition, the client may subsequently desire other benefits, such a long term care agreements or legacy payments.

Initially, the client provides his profile to the system and responds to the supplied decisions, as described above. Here, the client selected (1) a conversion period of fifteen years; (2) an IRA investment vehicle, which contains his initial $100,000 asset value; (3) a collar of 90%-110%, (4) survivorship payments of 100%; (5) a level benefit index; and (6) no stop/loss feature. In response the system calculates as of the current date a target income payment of $8655 per year for the desired benefits specified by the client. It is understood that this profile is only one example of the many benefits and decision responses available to users of this system.

Once the client has made his selection, the system performs one or more simulations, such as the simulation shown in simulation table 500, in order to illustrate to the client the risks of his selection as well as the statistical outcomes of his selection. After the simulation, the client may once again modify his decision responses until a satisfactory selection is made. Of course, it is understood, that the simulation incorporates statistical information, since the future performance of the stock market and interest rates cannot be predicated in advance to a certainty.

Accordingly, simulation table 500 is configured, according to one embodiment of the invention, to illustrate the statistical performance of an IRA account being converted to the secure retirement benefits of this system via a user-defined conversion period of 15 years. Notably, the conversion process for other investment vehicles, such as assets from a reverse mortgage, may be employed differently depending on tax consequences as well as the structure of withdrawing funds from the asset vehicle accounts.

The algorithm of simulation table 500 is best illustrated via the numeric values of columns 504-512. These include (1) conversion year column 504, which displays incrementally each year of the selected conversion period; (2) stock market return column 506, which displays the hypothetical market performance for each year of the conversion period; (3) current interest rate column 508, which displays the interest rate (10 year treasury) for each year of the conversion period; (4) total IRA and benefit vehicle (in this example, pension and survivor) beginning of year (BOY) value column 510, which displays the total market value of both the investment vehicle (in this example, IRA account) and benefit accounts at the beginning of each year of the conversion period; (5) target payment column 512, which displays the amount of benefit that can be purchased if the entire market value of the IRA and benefit account is used to accelerate the conversion period immediately; (6) collared payment 514, which displays the amount paid to the client as income based on the selected collar, for each year of the conversion period; (7) IRA beginning of year (BOY) market value column 516, which displays the market value of assets in the IRA account at the beginning of each year of the conversion period; (8) transfer payment column 518, which displays the amount allocated from the IRA account towards the benefit account for each year of the conversion period; (9) withdraw payment 520, which displays the amount withdrawn from the IRA account to supplement the remaining income not provided by the benefit account for each year of the conversion period; (10) IRA end of year (EOY) market value column 522, which displays the total value of assets in the IRA account at the end of each year of the conversion period; (11) benefit account beginning of year (BOY) market value column 524, which displays the total market value of benefit vehicles in the benefit account at the beginning of each year of the conversion period; (12) benefit account new purchased benefit column 526, which display the amount of new benefits purchased in the benefit account for each year of the conversion period; (13) benefit account cumulative purchased benefit column 528, which displays the cumulative amount of benefits purchased in the benefit account for each year of the conversion period; (14) benefit account end of year (EOY) value column 530, which displays the market value of benefits in the benefit account at the end of each year of the conversion period; and (15) actual total payment column 532, which displays the actual income payments provided to the client for each year of the conversion period.

As described above, the simulation provided by this invention, such as simulation table 500, is only based on a statistical estimate of the future market performance as well as other unknown elements, such as the health of the client. These statistical figures, according to one embodiment of the invention, are provided via mortality tables as well as Monte Carlo statistical analysis method, etc. Thus the above simulation is performed a plurality of times, wherein the average performance of all the simulations is displayed to the user in the form of the probability charts or probability tables. This embodiment will be described below, with reference to FIG. 6.

Thus, with continued reference to FIG. 5a, the algorithm of this invention is employed as follows, according to one embodiment. Initially, at the first year of the conversion process, the client has $100,000 in his IRA account (column 516) and $0 in his benefit account (column 524).

For each year of the conversion period, the assets in the IRA account are gradually converted to the benefit account. As stated above, this prolongs the client's exposure to the stock market and provides added liquidity that would not be available if the client directly bought such benefits without such a conversion period.

Illustratively, in the first year $100,000 is available in the IRA account, which can purchase joint and survivor income, paying $8655 per year. As a result the system obtains a $1/15^{th}$ portion of $8655 or a pension and survivor benefit of $577 (column 526). Notably, a portion of $100,000 is allocated towards the benefit account in order to obtain the pension and survivor of $577, which in this example is shown as $6,667 (column 518). In the second year of the conversion period, the market value of the IRA account and benefit account is $103,354, which can obtain a benefit paying $9143 per year. It is noted, that the IRA account has a higher market value than the first year due to appreciation in value from a positive stock market performance in that year.

At this point, the conversion calculation process is more detailed since the algorithm must take into account the benefit amount previously purchased in the benefit account. Therefore a $1/14^{th}$ portion of ($9143-$577) is obtained, shown as $612 (column 526). Similarly, in the third year, a $1/13^{th}$ portion of ($9867-$1189) is obtained, etc.

With reference to the percent of target box 534, it is shown that the initial income target of $8655 per year has been exceeded by 22%, wherein the conversion period benefitted from the stock market such that income payments of $10,540 have now been locked in. Thus, by utilizing the 15 year conversion period in this simulation the client achieved his objective of liquidity during the conversion and benefitted from the higher return of the stock market. It is understood, of course, that FIG. 5a is only one simulation and lower or higher returns are possible as well. For example, with reference to FIG. 5b the client did not achieve his target pension and survivor and with reference to FIG. 5c the client achieved approximately 100% of his objective.

The actual formulas used to calculate the simulation for the conversion process in the above-mentioned embodiment are shown in the following Table I.

TABLE I

| | |
|---|---|
| conversion year column 504 | present year of conversion process (referred to as 't'); t = 0 for year conversion began. |
| Stock market return column 506 | stock market performance for present year |
| Current interest rate column 508 | interest rate for present year (10 year treasury) |
| Combined market value of IRA account and benefit account at the beginning of the year col 510 | for initial value (t = 0): Deposit Amount for t > 0: (EOY market value of IRA account; col. 522) + (EOY market value of benefit account; col. 11) @ t-1 (prev. conversion year) |
| Available target payment benefit if entire col 510 is allocated towards the benefit; column 512 | (col 510)/(Value of benefit based on actuarial valuation i.e. the purchase price) wherein $$purchase\,price = \sum_{j=0}^{w-Min(x,y)-1} v_j^{j=1} \cdot (jP_{x+t} + jP_{y+1} - jP_{x+t} \cdot jP_{y+t})$$ wherein w is an age at which no one is expected to survive; $i_j$ is the interest rate for a j duration spot rate; $v = (1 + i_j)^{-1}$ and j $P_{x+1}$ is the probability of some one aged (x = t) to survive j years |
| Collared payment 514 | Max [90% * (Market value at col. 510/Value of Benefit @ t = 0 of col. 512), Min [110% * (Market value at col. 510/Value of Benefit @ t = 0 of col 512), (value of col. 512 @ t]] |
| IRA BOY market value column 516 | t = 0: Deposit Amount t > 0: (market value at EOY col 522) @ t − 1 |
| Transfer payment column 518, | Min[(market value at BOY col 516), or (Value of Benefit at (col 526) @ t] |
| Withdraw payment 520 | Min( (collared value of col 514) − (cumulative benefit purchased of col 528), or (market value of IRA BOY of col 516) − (transfer payment of col 518) * (1 + r(t))] where r is interest rate |
| IRA EOY value column 522 | (market value of IRA BOY of col 516) - (transfer payment of col 518) * (1 + r(t)) − (withdraw amount of col 520) |
| Benefit account BOY value column 524 | t = 0: 0 t > 0: (market value of benefit account EOY col 530) @ t − 1 |
| Benefit account newly purchased benefit col 526 | t = 0: (target payment of col 512)/(n − t) where n is the number of years in a conversion period t > 0: (target payment of col 512) − (cumulative benefit purchased of col 528) @ t − 1/(n − t) |
| Benefit account cumulative benefit purchased col 528 | t = 0: (newly purchased benefit of col 526) t > 0: ((cumulative benefit purchased of col 528) @ t − 1) + (newly purchased benefit of col 526) |
| Benefit account EOY value column | (Purchase Price of cumulative benefit purchased of col |

TABLE I-continued

| 530 | 528) |
|---|---|
| Actual total payment column 532 | (Withdrawal from IRA account col 520) + (cumulative benefit purchased col 528) |

Figure 8:
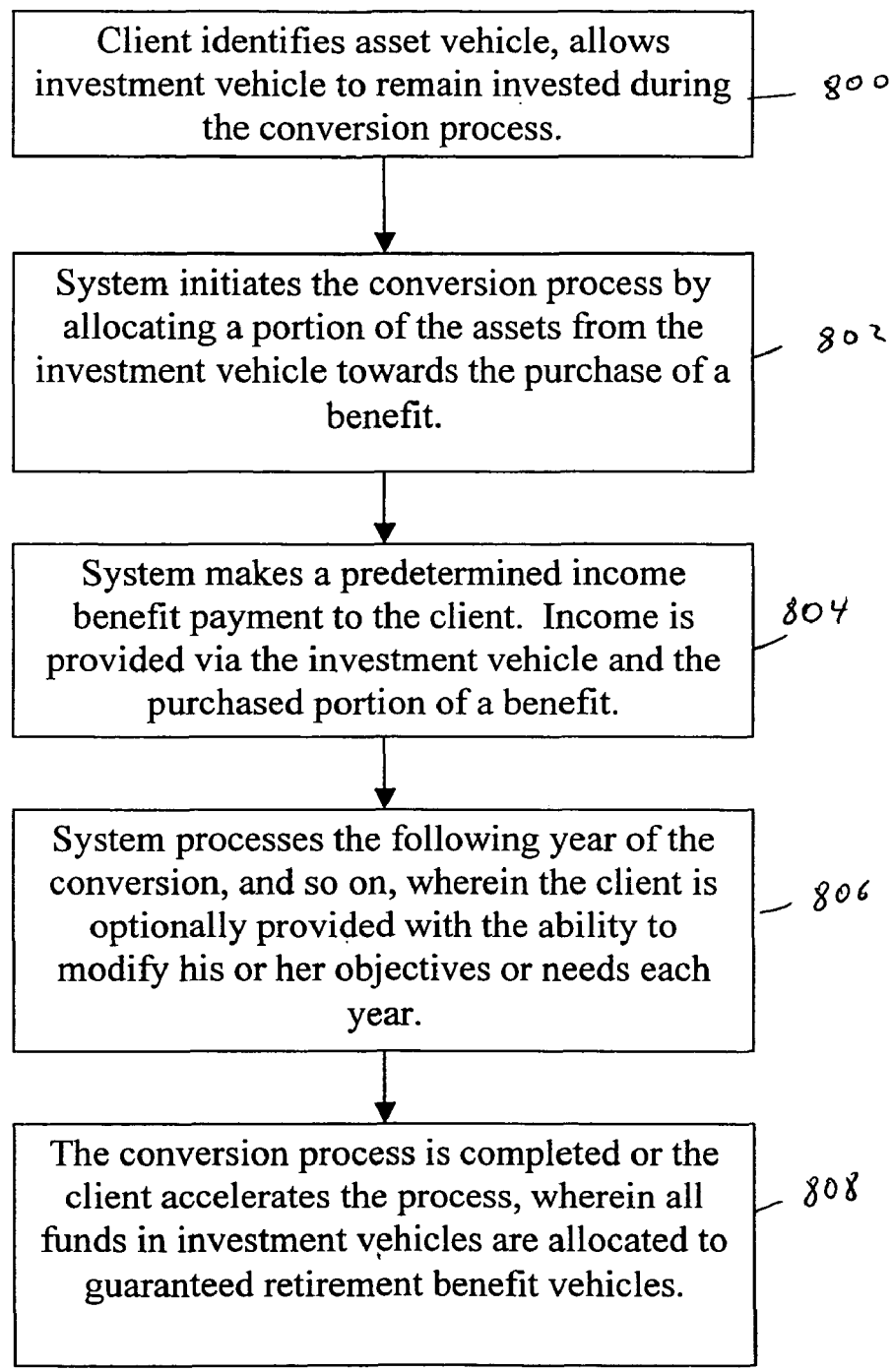
FIG. 8 illustrates a flow diagram of the relevant steps used by the conversion process algorithm of this invention, according to one embodiment of the invention.

With reference to FIG. 8, initially at step 800 the client identifies asset vehicle accounts and investment vehicles, such as an IRA account to be invested during the conversion process, as shown in column 516 (FIG. 5*a*) for the first year of the conversion period. In the example illustrated in FIG. 5*a* the initial investment is valued at $100,000. From this initial investment, according to one embodiment of the invention, the client requests for a retirement benefit in the form of income payments. With this system, rather than directly allocating a benefit that can provide such income payments, the client is able to retain his or her investments and its associated liquidity during a conversion period where the assets are gradually converted into guaranteed benefits.

At step 802, the system of this invention initiates the conversion process by allocating a portion of the assets from the investment vehicle towards the purchase of a benefit such as a pension. It is understood, as described above, that the funds in the investment vehicles may be mapped to a plurality of benefits that together form a benefit account that provides, among other things, guaranteed income. Column 518 (FIG. 5*a*) illustrates the amount of assets ($6,667) transferred from the IRA (asset vehicle) to the pension and survivor of the benefit account. The amount transferred for this year of the conversion period provides an annual income benefit in the amount of $577 (column 526). It is noted, that according to another embodiment of the invention, a larger or smaller portion of the IRA can be transferred for any given year. The factors that determine the amount and rate of transfer include: (1) the length of the conversion period; (2) the desired transfer rate of the client; (3) the conditions of the market (i.e. transfer higher amounts in years where purchase of pension income benefits are least expensive, and vice versa), etc.

At step 804, the predetermined benefit is distributed to the client. At this point, the purchased pension only provides $577 of income, far less than the desired $8655 as selected by the client. Rather, the system accumulates income benefits during the conversion process until the pension grows large enough to provide the client with all of his or her needs. Accordingly, $8078 (column 520) is withdrawn from the IRA, in conjunction with the $577 (column 526) of pension benefits to provide the client with $8655 of income (column 532) (See FIG. 5*a*). It is noted, as described above, that a collar may be selected to increase or decrease such income payments during the conversion based on the performance of the stock market, etc. (see column 514).

At step 806, the next year of the conversion period is initiated, wherein the client is optionally provided with the ability to modify his or her objectives or needs. For example, the client may increase or decrease his or benefit needs. Also, the client may accelerate the conversion process or alternatively lengthen it. In response to any changes, the system of this invention performs additional calculations and once again performs the operations of the conversion process by transferring a portion of the client's assets to a retirement benefits and distributing a portion of each to supply the client with income.

At step 808, the conversion process is completed or the client accelerates the process, wherein all assets are locked into a secure guaranteed retirement benefit vehicles, such as pension.

According to yet another embodiment of the invention, the conversion process can be employed with a reverse mortgage asset vehicle, rather than an IRA or in combination with an IRA account. A reverse mortgage enables a client who owns a home to tap to an immediate lump sum of cash, or an ongoing cash based on the value of the home. Any amounts used are paid back to the bank at the time the home is eventually sold, which may be after the life of the client. Thus, in accordance with another embodiment of the invention a reverse mortgage investment vehicle may be employed so as all or portions of loans from the bank can be allocated towards benefits desired by the client.

As described above, the scenario simulation tables shown in FIGS. 5*a*-5*c* are illustrations of many possible scenarios generated by the retirement system to provide statistical feedback to the client as to the risks and probabilities of success of his or her retirement objectives. According to one embodiment of the invention, the system calculates a plurality of such simulations to provide statistical feedback to the client of the possible outcomes of the conversion process.

Figure 6:
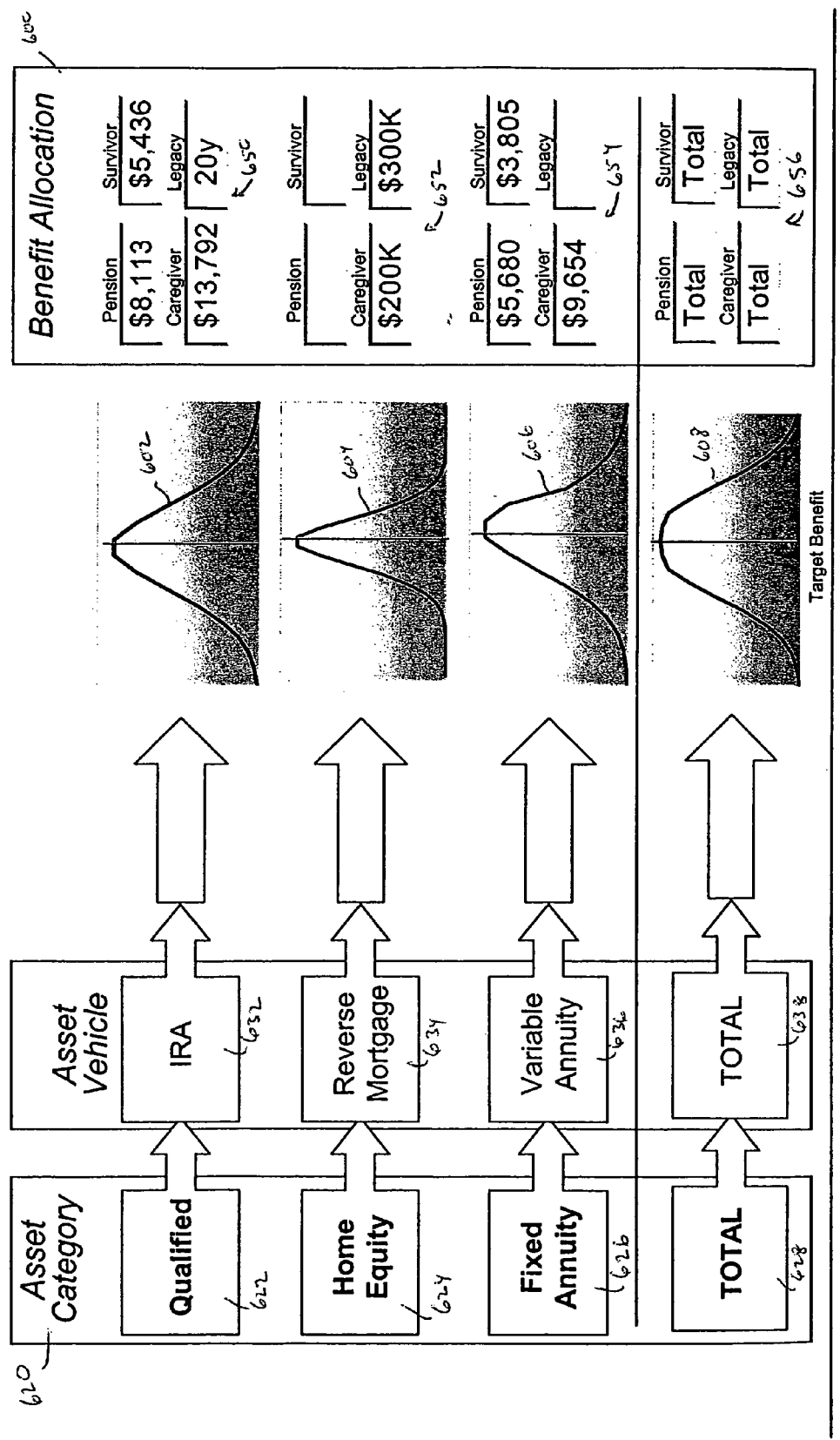
FIG. 6 illustrates a statistical view that is displayed to individual users of the system based on the simulations performed as illustrated in FIG. 5, in order to depict the risks and rewards of specific decisions made by each user, according to one embodiment.

With reference to FIG. 6, a sample simulation display 600 is shown illustrating, according to one embodiment of the invention, the probability distribution results of all such plurality of simulation scenarios generated for a particular client simulation. Thus, for example, when a client interacts with the system via the system interface illustrated in FIG. 4*b*, the results of the simulations are calculated as illustrated in FIGS. 5*a*-5*c* and displayed to client in the form of FIG. 6 in response to the client requesting the probability results.

Specifically, simulation display 600 illustrates one example of a display that the system may provide. Thus, display 600 includes an asset category portion 620 that provides the information concerning various asset categories owned by the client. In this example, the display shows a qualified retirement account 622, home equity 624, a fixed deferred annuity 626 and the total value of these assets.

Display 600 also includes an asset vehicle account information portion 630 that illustrates the asset vehicle accounts that are employed by the system to set up the client's benefit account. Thus, the display shows an IRA account 632, a reverse mortgage account 634 and a variable annuity account 636. The total value of these asset vehicle accounts is also provided at space 638.

The collar portion 640 illustrates the percentage spread below and over a desired benefit target that a client is willing to accept. Pension portion 642 illustrates the type of benefit index that a client has chosen as discussed above in reference with FIG. 1.

Display 600 also illustrates exemplary charts 602-608 that provide information on the statistical chances of achieving the desired benefits. These statistical results are shown for a variety of investment vehicle conversion algorithms, such as conversion from an IRA, reverse mortgage, or variable annuity asset vehicle. Similarly, distribution results for each of the above-mentioned asset vehicles are provided as well. Thus, each chart illustrates a statistical result indicating the probability that a client could achieve 100% of the desired benefit after the conversion period, or the probability that the client could end up achieving less or more than the desired benefit. It is understood, of course, that the simulation chart of FIG. 6 can be configured to illustrate such statistical analysis to the client with alternative illustrations as well.

Chart 608 illustrates the distribution of probability of success that a client can achieve the desired benefits after aggregating all the investment vehicles towards mapping various benefits that form the benefit account of the client.

Finally display 600 illustrates a hypothetical benefit account set up by the client with various allocation of benefits derived from a corresponding asset vehicle account. Thus section 650 of the display illustrates a desired pension and survivor, a survivor benefit, a caregiver and a legacy income payment of 20 years from the period the client and spouse were alive. The benefits illustrated in section 650 are funded by asset vehicle account 632. Similarly, benefits displayed in section 652 are funded by asset vehicle account 634, and the benefits displayed in section 654 are funded by asset vehicle account 636. The total sum of benefits in the client's hypothetical benefit account is illustrated in section 656 of the display.

According to one embodiment of this invention, this conversion process is executed by the retirement system according to continuous updated instructions provided by the individual. In addition, the retirement system may be configured to help the individual make an informed decision by evaluating his or her retirement objectives as well as providing simulations and other interactive elements.

Figure 7A:
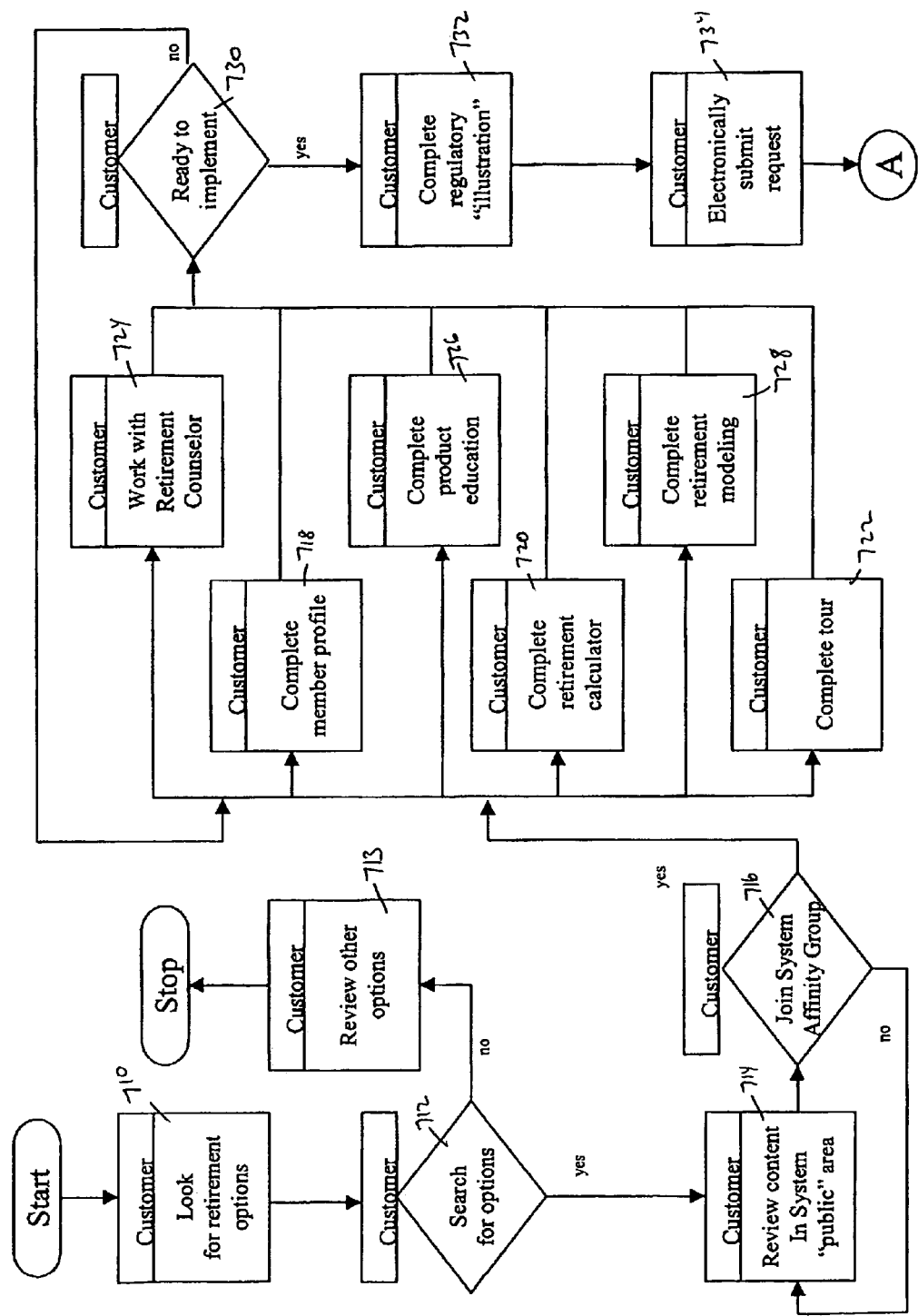
FIGS. 7a and 7b illustrate a flow diagram of the relevant steps used by the retirement system of this invention, according to one embodiment of the invention.
Figure 7B:
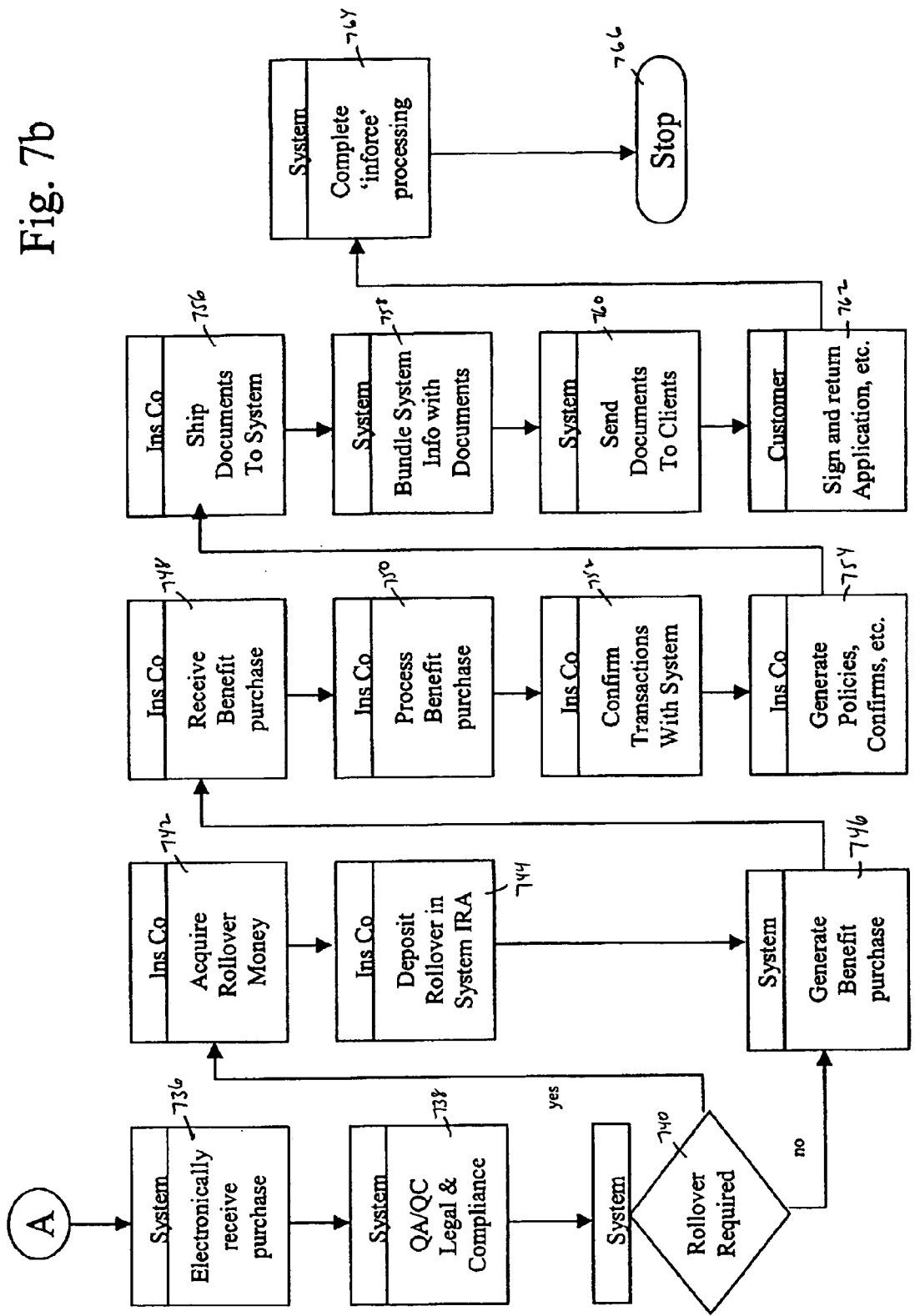

FIGS. 7a and 7b illustrate a process flow in accordance with one embodiment of the present invention. The exemplary process illustrated in these figures relate to an arrangement of the system, where client employs qualified plans asset category, and the purchases of benefits are funded by insurance contracts and the system provides for the clients' convenience, an on-line retirement counselor. Thus, at step 710 a prospective customer connects to retirement system 100 of FIG. 1 and begins to look for retirement options. At decision step 712 if the customer decides not to search for retirement option, the system then goes to step 713 and provides the customer with a review of other options. Otherwise, the system goes to step 714 and allows the customer to review the contents of the system's public area display. At decision step 716, if the customer decides to join, the system goes to step 718 to query the customer profile.

At step 722, the system provides a complete tour of all the benefits available to the customer. At step 720 the customer may employ a retirement calculator that provides budget and other information.

Whenever the customer requires additional information, the system may allow the customer to work with a retirement counselor, on-line, at step 724. In the alternative, at step 726, customer may also have access to product education.

At step 728 the customer may complete the retirement modeling as indicated in reference with FIG. 4b, wherein a plurality of conversion periods and decisions are tested and a satisfactory retirement program is selected. The system then goes to step 730 and if the customer is ready to purchase it then goes to step 732 to provide the customer with an illustration, required by regulation, which discloses information about all of the products funding the benefits. At step 734, the customer electronically submits the request to purchase the benefits.

As illustrated in FIG. 7b, at step 736 the system receives the customer's request and after performing quality assurance and quality checks and legal compliance at step 738, the system determines whether a rollover of investment vehicles is required. If so, the system goes to step 742 to acquire the customer's investment vehicle and deposit the funds to a new investment vehicle, such as the system IRA that is maintained directly by the system.

The system then goes to step 746 to begin the allocation of asset vehicle funds towards purchase of various desired benefits. Thereafter, an entity that maintains the customer's benefit account, for example, an insurance company, at step 748 receives the benefit allocation request and processes the benefit purchase at step 750.

The insurance company, at step 752 confirms the transaction with system 100 and at step 754 various contracts, policies and other benefit vehicles are generated. At step 756, the documents corresponding to the benefit vehicles are shipped to the system, whereas at step 758, the system bundles the documents along with additional information for the customer. At step 760, the system sends the documents to the customer, wherein at step 762, the customer signs and returns them to the system. At step 764 the processing is completed.

It is noted that the customer at any time can visit the system and modify the benefits based on change in circumstances as explained before.

Thus, while there have been shown and described and pointed out fundamental novel features of the invention as applied to alternative embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto. It is to be understood that the drawings are not necessarily drawn to scale, but that they are merely conceptual in nature.

What is claimed is:

1. An integrated computer system for planning for implementing and administering a retirement benefit program including at least one guaranteed life-dependent retirement benefit to provide a guaranteed lifetime income to at least one person using at least one or more personal financial assets owned by the person, the integrated computer system comprising:

(a) at least one server operatively coupled to a network to establish a data communications link with at least one remote client computer operatively connected to the network, the server being adapted to store information received from at least the remote client computer necessary to plan for, implement and administer the retirement benefit program and being further adapted to provide information related to the person's retirement benefit program to at least the remote client computer;

(b) the server including at least one controller adapted for performing operations of the integrated computer system, the controller being operatively coupled to storage means for storing financial and statistical information and retirement benefit program information necessary to at least calculate current and future values of (i) asset vehicles, including one or more personal financial assets owned by the person, (ii) one or more guaranteed life-dependent retirement benefits selected by the person, and (iii) benefit payments to the person, the controller being operatively coupled to an allocation component to provide at least allocation instructions to the allocation component;

(c) the allocation component being adapted to execute at selected intervals of an allocation period in accordance with at least a first set of instructions an allocation of a portion of funds corresponding to at least one asset vehicle containing one or more personal financial assets owned by the person towards purchasing one or more fractions of at least a first guaranteed life-dependent retirement benefit that provides one or more income benefit payments to the person to thereby gradually purchase the first retirement benefit during the allocation period while allowing a remainder of the funds corresponding to the asset vehicle to generate investment returns, the first set of allocation instructions including at least information specified by the person;

(d) the controller being adapted to calculate as of a current date: (i) a total current value representative of a sum of a current value of the first retirement benefit purchased to date based on an individual, personal actuarial valuation of the benefit and a market value of the asset vehicle, and (ii) a target benefit payment value representative of a benefit payment available to the person if the allocation component immediately accelerates the allocation period by executing an allocation of funds corresponding to the total current value towards purchasing a remainder of at least the first guaranteed life-dependent retirement benefit, (e) and to calculate for each future interval of the allocation period: (i) a total current value and (ii) a target benefit payment, employing at least relevant portions of the stored financial and statistical information related to future market performance, inflation and interest rates, the server providing the total current value and the target benefit payment value as of the current date, and the total current values and the target benefit payment values of future intervals of the allocation period to at least the remote client computer for consideration by the person;

(f) the controller being further adapted to recalculate for each future interval of the allocation period a recalculated total current value and a recalculated target benefit payment value based on at least change information received from at least the remote client computer including at least one change to the retirement benefit program specified by the person, the server providing the recalculated total current values and the recalculated target benefit payment values of future intervals of the allocation period to at least the remote client computer for consideration by the person; and (g) the allocation component being further adapted to alter the allocation of funds towards achieving the recalculated total current values and the recalculated target benefit payment values in accordance with at least a second set of instructions including at least information specified by the person based on the at least one change to the retirement benefit program.

2. The integrated computer system of claim 1, wherein the at least one change to the retirement benefit program specified by the person includes at least one of:
(i) a change in a length of the allocation period, and (ii) one or more changes in the at least first guaranteed life-dependent retirement benefit.

3. The integrated computer system of claim 1, wherein the server is further adapted to calculate a plurality of benefit payments to the person during and after the allocation period and to execute payment of each of the plurality of benefit payments to the person, each benefit payment being made to the person during the allocation period comprising a sum of a portion of funds from the at least one asset vehicle and one or more payments from the at least one guaranteed life-dependent retirement benefit purchased, and each benefit payment being made to the person after expiration of the allocation period comprising payments from the at least one retirement benefit purchased.

4. The integrated computer system of claim 1, wherein the relevant portions of the stored financial and statistical information include at least one of: (i) historical market returns, (ii) simulated market returns, (iii) current interest rates, (iv) simulated interest rates, (v) current cost of living indices, and (vi) simulated cost of living indices, respectively, and wherein the server is further adapted to employ additional information including at least one or more person-specified personal choices related to the retirement benefit program to calculate the future total current values and the future target benefit payments.

5. The integrated computer system of claim 1, wherein the at least one change to the retirement benefit program specified by the person includes at least one of:
(i) one or more modifications of the allocation period, (ii) one or more modifications of the allocation of funds corresponding to the at least one asset vehicle, (iii) one or more modifications of the at least first guaranteed life-dependent retirement benefit, and (iv) one or more personal choices specified by the person related to the retirement benefit program.

6. The integrated computer system of claim 1, wherein the server is further adapted to process information received from at least the remote client computer related to acceleration of the allocation period to instruct the allocation component to execute an allocation of at least a portion of funds corresponding to the total current value towards purchasing a remainder of the at least first guaranteed life-dependent retirement benefit.

7. The integrated computer system of claim 1, wherein the server further includes at least one simulation component adapted to generate a plurality of sample retirement benefit programs in accordance with at least one of: (i) one or more choices specified by the person and (ii) one or more modifications to a sample retirement benefit program specified by the person, each sample retirement benefit program including simulated results of allocations of portions of funds corresponding to the at least one asset vehicle towards gradually purchasing one or more fractions of at least one of a plurality of available guaranteed life-dependent retirement benefits at one or more selected intervals of the at least one of a plurality of available allocation periods, and wherein the server is further adapted to provide to at least the remote client computer the simulated results.

8. The integrated computer system of claim 7, wherein the simulated results include simulated total current values and simulated target benefit payment values for the one or more selected intervals of the at least one available allocation period.

9. The integrated computer system of claim 7, wherein the simulation component generates the simulated results as a function of at least one of: (i) simulated market performance information, (ii) simulated interest rates, and (iii) simulated inflation rates.

10. The integrated computer system of claim 7, wherein the simulation component is further adapted to statistically calculate simulated purchase prices of the one or more fractions of the at least one available guaranteed, life-dependent retirement benefit, and wherein the server is adapted to provide the simulated purchase prices to at least the remote client computer.

11. The integrated computer system of claim 10, wherein the simulation component is further adapted to statistically calculate the simulated purchase prices by employing information related to simulated interest rates and at least one of: (i) information related to projected morbidity of the person; and (ii) information related to projected longevity of the person.

12. The integrated computer system of claim 7, wherein the simulation component is further adapted to statistically determine at least one probability of achieving or exceeding the at least one available guaranteed life-dependent retirement benefit at an expiration of the at least one available allocation period, and wherein the server is adapted to provide the at least one probability to at least the remote client computer.

13. The integrated computer system of claim 7 wherein the server is adapted to receive person-specified information from at least the remote client computer including at least one of: (i) information related to acceptance by the person of the one or more modifications; (ii) information related to rejection by the person of the one or more modifications, and (iii) information related to one or more modifications to the sample benefit program specified by the person, and wherein the simulation component is further adapted to recalculate the simulated results in accordance with the one or more modifications.

14. The integrated computer system of claim 1, wherein the server further includes at least one actuarial valuation component adapted to perform for each of selected intervals of the allocation period an actuarial valuation of the at least first guaranteed life-dependent retirement benefit purchased to date.

15. The integrated computer system of claim 1, wherein the controller is further adapted to calculate for selected intervals of the allocation period a market value of a remainder of the asset vehicle.

16. The integrated computer system of claim 1, wherein the server is further adapted to provide to at least the remote client computer information to query the person with respect to at least one of: (i) one or more of a plurality of available guaranteed life-dependent retirement benefits the person desires, (ii) one or more of a plurality of available allocation periods the person desires, (iii) a risk tolerance of the person, (iv) one or more personal financial assets owned by the person, (iv) age of the person, and age of the person's spouse, if any, (v) health status of the person, and (vi) one or more personal choices of the person related to the retirement benefit program, and to process information including at least one response the person provides in response to the query information toward implementing the retirement benefit program.

17. The integrated computer system of claim 1, wherein the server is adapted to receive from at least the remote client computer information related to a person-specified benefit index desired for the at least first guaranteed life-dependent retirement benefit, the person-specified benefit index being selected from the group consisting of: (i) a level index, (ii) a COLA (CPI-linked) index, and (iii) a market-linked index, and to process the benefit index information towards implementing the retirement benefit program.

18. The integrated computer system of claim 1, wherein the server is adapted to receive from at least the remote client computer information related to a person-specified benefit payment collar, the person-specified benefit collar corresponding to a percentage range below and above a benefit payment in order to dampen the volatility in income payments received, and to process the benefit collar information towards implementing the retirement benefit program.

19. The integrated computer system of claim 1, wherein the server is adapted to receive from at least the remote client computer information related to a person-specified stop/loss indication, the person-specified stop/loss indication corresponding to a person-defined threshold level the server employs to indicate to the person during the allocation period the asset vehicle has reached at least one of: (i) a desired high market value, (ii) a desired low market value, and to process the stop/loss indication information toward implementing the retirement benefit program.

20. The integrated computer system of claim 14, wherein the current value of the at least first guaranteed life-dependent retirement benefit as of the current date and for each of future intervals of the allocation period includes actuarial valuations of the at least first guaranteed life-dependent benefit purchased.

21. The integrated computer system of claim 1, wherein the at least one asset vehicle includes one or more investment vehicles configured to generate investment returns during the allocation period to at least one of: (i) fund purchases of the at least first guaranteed life-dependent retirement benefit; and (ii) fund at least a portion of the plurality of benefit payments to the person.

22. The integrated computer system of claim 1, wherein the remote client computer includes a remote computer operated by at least one of: (i) the person, (ii) a representative of the person, (iii) an advisor of the person.

23. The integrated computer system of claim 1, wherein the remote client computer is operatively connected through the network to at least one computing device operated by the person.

24. An integrated computer system for planning for, implementing and administering a retirement benefit program including at least one guaranteed life-dependent retirement benefits to provide a guaranteed lifetime income to at least one person using at least one or more personal financial assets owned by the person, the integrated computer system comprising:

(a) at least one server operatively coupled to a network to establish a data communications link with at least one remote client computer operatively connected to the network, the server being adapted to store information received from at least the remote client computer necessary to plan for, implement and administer the retirement benefit program and being further adapted to provide information related to the person's retirement benefit program to at least the remote client computer;

(b) the server including at least one controller adapted for performing operations of the integrated computer system, the controller being operatively coupled to storage means for storing financial and statistical information and retirement benefit program information necessary to at least calculate current and future values of (i) asset vehicles, including one or more personal financial assets owned by the person, (ii) one or more guaranteed life-dependent retirement benefits selected by the person, and (iii) benefit payments to the person, the controller being operatively coupled to at least one simulation component to provide instructions to the simulation component;

(c) the simulation component being adapted to generate a plurality of sample retirement benefit programs in accordance with one or more retirement benefit program choices specified by the person, each sample retirement benefit program including simulated results of allocations of portions of funds corresponding to at least one asset vehicle containing one or more personal financial assets owned by the person towards purchasing one or more fractions of at least one of a plurality of available guaranteed life-dependent retirement benefits at selected intervals of at least one of a plurality of available allocation periods, the server providing to at least the remote client computer the simulated results for consideration by the person;

(d) the simulated results including for each of selected intervals of the available allocation period: (i) a simulated total current value representative of a sum of a current value of the available guaranteed life-dependent retirement benefit purchased to date based on an individual, personal actuarial valuation of the benefit and a market value of the asset vehicle, and (ii) a simulated target benefit payment value representative of a benefit payment available to the person if the controller immediately accelerates the allocation period by executing an allocation of funds corresponding to the simulated total current value towards purchasing a remainder of the available guaranteed life-dependent retirement benefit, the server providing the simulated results to at least the remote client computer for consideration by the person;

(e) the simulation component being further adapted to recalculate the simulated total current value and the simulated target benefit payment value for each of selected intervals of the available allocation period based on at least change information received from at least the remote client computer including at least one change to the sample retirement benefit program specified by the person, the server providing to at least the remote client computer the recalculated simulated results for consideration by the person; and (f) the controller being adapted to implement at least one actual retirement benefit program based on selection information received from at least the remote client computer including information identifying at least one sample retirement benefit program selected by the person for implementation.

25. The integrated computer system of claim 24, wherein the simulation component is further adapted to statistically calculate simulated purchase prices of the one or more fractions of the available guaranteed life-dependent retirement benefit employing at least relevant portions of the stored financial and statistical information and the retirement benefit program information.

26. A method for planning for, implementing and administering a retirement benefit program including at least one guaranteed, life-dependent retirement benefit to provide a guaranteed lifetime income to at least one person using at least one or more personal financial assets owned by the person, the method comprising:

(a) allocating by use of a computing device and at selected intervals of an allocation period in accordance with at least a first set of instructions an allocation of a portion of funds corresponding to at least one asset vehicle, containing one or more personal financial assets owned by the person, towards purchasing one or more fractions of at least a first guaranteed life-dependent retirement benefit that provides one or more income benefit payments to the person to gradually purchase the at least first retirement benefit during the allocation period while allowing a remainder of the funds corresponding to the asset vehicle to generate investment returns, the first set of allocation instructions including at least information specified by the person;

(b) calculating by use of said computing device and as of a current date: (i) a total current value representative of a sum of a current value of the first retirement benefit purchased to date based on an individual, personal actuarial valuation of the benefit and a market value of the asset vehicle, and (ii) a target benefit payment value representative of a benefit payment available to the person if the programmed computer immediately accelerates the allocation period by executing an allocation of funds corresponding to the total current value towards purchasing a remainder of at least the first guaranteed life-dependent retirement benefit, (c) calculating by use of said computing device and for each future interval of the allocation period: (i) a total current value and (ii) a target benefit payment, employing at least relevant portions of financial and statistical information related to future market performance, inflation and interest rates, and providing the total current value and the target benefit payment value as of the current date, and the total current values and the target benefit payments of future intervals of the allocation period to at least one remote client computer for consideration by the person;

(d) recalculating by use of said computing device and for each future interval of the allocation period a recalculated total current value and a recalculated target benefit payment value based on at least change information received from at least the remote client computer including at least one change to the retirement benefit program specified by the person, and providing the recalculated total current values and the recalculated target benefit payment values of future intervals of the allocation period to at least the remote client computer for consideration by the person; and (e) altering, by use of said computing device, the allocation of funds towards achieving the recalculated total current values and the recalculated target benefit payment values in accordance with at least a second set of instructions including at least information specified by the person based on the at least one change to the retirement benefit program.

27. The method of claim 26, wherein the at least one change to the retirement benefit program specified by the person includes at least one of: (i) a change in a length of the allocation period, (ii) one or more changes in the at least first guaranteed life-dependent retirement benefit, (iii) one or more modifications of the allocation period, (iv) one or more modifications of the allocation of funds corresponding to the at least one asset vehicle, (v) one or more modifications of the at least first guaranteed life-dependent retirement benefit, and (vi) one or more personal choices specified by the person related to the retirement benefit program.

28. The method of claim 26, further comprising calculating a plurality of benefit payments to the person during and after the allocation period and executing payment of each of the plurality of benefit payments to the person, each benefit payment being made to the person during the allocation period comprising a sum of a portion of funds from the at least one asset vehicle and one or more payments from the at least one guaranteed life-dependent retirement benefit purchased, and each benefit payment being made to the person after expiration of the allocation period comprising payments from the at least one retirement benefit purchased.

29. The method of claim 26, wherein the at least relevant portions of financial and statistical information related to future market performance, inflation and interest rates include at least one of: (i) historical market returns, (ii) simulated market returns, (iii) current interest rates, (iv) simulated interest rates, (v) current cost of living indices, and (vi) simulated cost of living indices, respectively, and wherein the server is further adapted to employ additional information including at least one or more person-specified personal choices related to the retirement benefit program to calculate the future total current values and the future target benefit payments.

30. The method of claim 26, further comprising processing information received from the least one remote client computer related to acceleration of the allocation period and accelerating the allocation period by allocating at least a portion of funds corresponding to the total current value towards purchasing a remainder of the at least first guaranteed life-dependent retirement benefit.

31. The method of claim 26, further comprising simulating a plurality of sample retirement benefit programs in accordance with at least one of: (i) one or more choices specified by the person and (ii) one or more modifications to a sample retirement benefit program specified by the person, each sample retirement benefit program including simulated results of allocations of portions of funds corresponding to the at least one asset vehicle towards gradually purchasing one or more fractions of at least one of a plurality of available guaranteed life-dependent retirement benefits at one or more selected intervals of the at least one of a plurality of available allocation periods, and providing the simulated results to at least the remote client computer.

32. The method of claim 31, wherein the simulated results include simulated total current values and simulated target benefit payment values for the one or more selected intervals of the at least one available allocation period, and further comprising calculating statistically simulated purchase prices by employing information related to simulated interest rates and at least one of: (i) information related to projected morbidity of the person; and (ii) information related to projected longevity of the person.

33. The method of claim 31, wherein calculating the simulated results includes calculating the simulated results as a function of at least one of: (i) simulated market performance information, (ii) simulated interest rates, and (iii) simulated inflation rates, and further comprising statistically calculating at least one probability of achieving the at least one available guaranteed life-dependent retirement benefit at an expiration of the at least one available allocation period.

34. The method of claim 31, further comprising querying at least the remote client computer to provide information related to at least one of: (i) information related to acceptance by the person of the one or more modifications; (ii) information related to rejection by the person of the one or more modifications, and (iii) information related to one or more modifications to the sample benefit program specified by the person, and further comprising recalculating the simulated results in accordance with the one or more modifications.

35. The method of claim 31, further comprising altering the allocation of funds in accordance with the simulated results in response to receiving information related to acceptance by the person of the one or more modifications.

36. The method of claim 26, further comprising querying at least the remote client computer to provide information of at least one of: (i) one or more of a plurality of available guaranteed life-dependent retirement benefits the person desires, (ii) one or more of a plurality of available allocation periods the person desires, (iii) a risk tolerance of the person, (iv) one or more personal financial assets owned by the person, (iv) age of the person, and age of the person's spouse, if any, (v) health status of the person, and (vi) one or more personal choices of the person related to the retirement benefit program, and processing at least one response the person provides to querying towards implementing the retirement benefit program.

37. The method of claim 26, wherein calculating the current value of the at least first guaranteed life-dependent retirement benefit as of a current date and for each of future intervals of the allocation period includes performing actuarial valuations of the at least first guaranteed life-dependent retirement benefit purchased.

38. The method of claim 26, wherein the remote client computer includes a remote computer operated by at least one of: (i) the person, (ii) a representative of the person, and (iii) an advisor of the person.

39. The method of claim 26, wherein the remote client computer is operatively connected to at least one computing device operated by the person.

* * * * *